United States Patent
Lu et al.

(10) Patent No.: US 11,310,658 B2
(45) Date of Patent: Apr. 19, 2022

(54) METHOD AND APPARATUS FOR DETERMINING STATUS OF TERMINAL DEVICE, AND DEVICE

(71) Applicant: HUAWEI TECHNOLOGIES CO., LTD., Guangdong (CN)

(72) Inventors: Wei Lu, Shenzhen (CN); Huan Li, Shanghai (CN); Weisheng Jin, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 58 days.

(21) Appl. No.: 16/850,316

(22) Filed: Apr. 16, 2020

(65) Prior Publication Data
US 2020/0296575 A1 Sep. 17, 2020

Related U.S. Application Data

(63) Continuation of application No. PCT/CN2018/110528, filed on Oct. 16, 2018.

(30) Foreign Application Priority Data

Oct. 17, 2017 (CN) .......................... 201710968729.1

(51) Int. Cl.
*H04W 8/20* (2009.01)
*H04W 8/24* (2009.01)

(52) U.S. Cl.
CPC .......... *H04W 8/205* (2013.01); *H04W 8/245* (2013.01)

(58) Field of Classification Search
CPC ......... H04W 8/205; H04W 8/22; H04W 8/24; H04W 8/245
See application file for complete search history.

(56) References Cited

U.S. PATENT DOCUMENTS

| | | | |
|---|---|---|---|
| 5,410,543 A * | 4/1995 | Seitz | H04L 29/06 370/463 |
| 2013/0303152 A1* | 11/2013 | Kim | H04W 16/14 455/422.1 |

(Continued)

FOREIGN PATENT DOCUMENTS

| | | |
|---|---|---|
| CN | 101835127 A | 9/2010 |
| CN | 102026263 A | 4/2011 |

(Continued)

OTHER PUBLICATIONS

3GPP TS 23.501 V1.4.0(Sep. 2017),"3rd Generation Partnership Project; Technical Specification Group Services and System Aspects; System Architecture for the 5G System;Stage 2 (Release 15)", Sep. 28, 2017 (Sep. 28, 2017), XP051359415.total 152 pages.

(Continued)

*Primary Examiner* — Stephen J Clawson
(74) *Attorney, Agent, or Firm* — Womble Bond Dickinson (US) LLP

(57) ABSTRACT

A method and an apparatus for determining a status of a terminal device, and a device are disclosed. The method includes: obtaining, by an access and mobility management network element, an access type used by the terminal device to access a network, where the access type includes at least one of 3rd generation partnership project (3GPP) access and non-3GPP access; and determining, by the access and mobility management network element based on a status of the terminal device in the access type, the status of the terminal device, where the status of the terminal device includes at least one of a loss-of-connectivity state and an available-to-connectivity state. By using the method according to the embodiments of the present disclosure, accuracy of determining the status of the terminal device is improved.

19 Claims, 11 Drawing Sheets

(56) References Cited

U.S. PATENT DOCUMENTS

| | | | | |
|---|---|---|---|---|
| 2014/0162545 | A1* | 6/2014 | Edge | H04W 28/06 455/3.01 |
| 2015/0092701 | A1* | 4/2015 | Horn | H04W 4/50 370/329 |
| 2015/0237576 | A1* | 8/2015 | Lee | H04W 56/00 370/311 |
| 2017/0230817 | A1* | 8/2017 | Ryu | H04W 8/04 |
| 2019/0007992 | A1* | 1/2019 | Kim | H04W 64/006 |
| 2019/0059067 | A1* | 2/2019 | Lee | H04L 47/821 |
| 2019/0116486 | A1* | 4/2019 | Kim | H04W 8/10 |
| 2019/0349849 | A1* | 11/2019 | Kavuri | H04W 8/22 |
| 2019/0394833 | A1* | 12/2019 | Talebi Fard | H04W 60/00 |

FOREIGN PATENT DOCUMENTS

| | | |
|---|---|---|
| CN | 104539637 A | 4/2015 |
| CN | 105050048 A | 11/2015 |
| CN | 107079363 A | 8/2017 |
| EP | 3182754 A1 | 6/2017 |

OTHER PUBLICATIONS

ETRI,"TS 23:501: P-CR to add UE reachability for Non-3GPP",SA WG2 Meeting #120 S2-172171,27 Mar. 31, 2017, Busan, Korea,Total 2 Pages.

3GPP TS 23.401 V15.1.0 (Sep. 2017);3rd Generation Partnership Project;Technical Specification Group Services and System Aspects;General Packet Radio Service (GPRS) enhancements for Evolved Universal Terrestrial Radio Access Network (E-UTRAN) access(Release 15);Total 397 Pages.

Ericsson,"TS 23.502: 5GS Terminology and other corrections",SA WG2 Meeting #122E e-meeting S2-176778,11 Sep. 15, 2017, Elbonia,Total 159 Pages.

3GPP TS 23.060 V15.0 0 (Sep. 2017);3rd Generation Partnership Project;Technical Specification Group Services and System Aspects;General Packet Radio Service (GPRS);Service description;Stage 2(Release 15);Total 367 Pages.

Nokia, Nokia Shanghai Bell, 23.501 5.3 and 5.4: AMF UE state information terminology update. SA WG2 Meeting #122E, Sep. 11-15, 2017, Elbonia , S2-176773, 11 pages.

* cited by examiner

METHOD AND APPARATUS FOR DETERMINING STATUS OF TERMINAL DEVICE, AND DEVICE

CROSS-REFERENCE TO RELATED APPLICATIONS

This application is a continuation of International Application No. PCT/CN2018/110528, filed on Oct. 16, 2018, which claims priority to Chinese Patent Application No. 201710968729.1, filed on Oct. 17, 2017. The disclosures of the aforementioned applications are hereby incorporated by reference in their entireties.

TECHNICAL FIELD

The present disclosure relates to the communication access field, and in particular, to a method and an apparatus for determining a status of a terminal device, and a device.

BACKGROUND

A status of a terminal device, for example, whether the terminal device is in an available-to-connectivity state or a loss-of-connectivity state, is an important parameter for an operator network. The operator network may set, based on information about the parameter, a policy used to transmit a data packet.

In a 4G communications system, whether the terminal device is in the loss-of-connectivity state is determined based on whether a mobile reachable timer on a mobility management network element has expired. If the mobile reachable timer has expired, it is considered that the terminal device is in the loss-of-connectivity state, or if the mobile reachable timer has not expired, it may be considered that the terminal device is in the available-to-connectivity state.

However, in a 5G network, the status of the terminal device cannot be accurately determined based on the mobile reachable timer of the terminal device.

SUMMARY

The present disclosure provides a method and an apparatus for determining a status of a terminal device, and a device, to improve accuracy of determining the status of the terminal device.

According to a first aspect, an embodiment of the present disclosure provides a method for determining a status of a terminal device. The method may include: obtaining, by an access and mobility management network element, an access type used by the terminal device to access a network, where the access type includes at least one of 3GPP access and non-3GPP access; and determining, by the access and mobility management network element based on a status of the terminal device in the access type, the status of the terminal device, where the status of the terminal device includes at least one of a loss-of-connectivity state and an available-to-connectivity state.

In the foregoing process, the terminal device may access the network by using the 3GPP and/or the non-3GPP, and the access and mobility management network element may first obtain the access type used by the terminal device to access the network, and determine, based on a connection status of the terminal device in the access type, the status of the terminal device. Because the status of the terminal device is related to the connection status of the terminal device in the access type, the access and mobility management network element can accurately obtain the status of the terminal device.

In this embodiment of the present disclosure, the access and mobility management network element may determine the status of the terminal device by using a terminal device as a granularity, or may determine the status of the terminal device by using a server as a granularity. When the access and mobility management network element determines the status of the terminal device by using the server as the granularity, the status of the terminal device may also be referred to as a status of the terminal device corresponding to the server.

In one embodiment, the access and mobility management network element may obtain the access type used by the terminal device to access the network by using at least the following two feasible implementations.

Manner 1:

The access and mobility management network element determines a server accessed by the terminal device, and obtains an access type used by the terminal device to access the server.

In one embodiment, the access and mobility management network element may receive an access type that is sent by the terminal device and that is used by the terminal device to access the server.

Manner 2:

The access and mobility management network element receives the access type that is sent by a network device and that is used by the terminal device to access the network. The network device includes at least one of a server, a network exposure function network element, a policy control function network element, and a database.

In one embodiment, the access and mobility management network element may alternatively send identification information of the terminal device to the network device before receiving the access type that is sent by the network device and that is used by the terminal device to access the network.

In this feasible implementation, the access and mobility management network element may directly obtain, from another network device, the access type used by the terminal device to access the network, so that the access type used by the terminal device to access the network may be quickly obtained.

In one embodiment, the access and mobility management network element may alternatively determine the status of the terminal device in the access type before determining, based on the status of the terminal device in the access type, the status of the terminal device. For example, at least the following two possible scenarios may be included.

Scenario 1: The access type used by the terminal device to access the network is the 3GPP access.

In this scenario, the access and mobility management network element may determine a status of the terminal device in the 3GPP access by using the following feasible implementation. If the terminal device is in a mobile initiated connection only (MICO) mode and an idle state or if the terminal device is located in a restricted service area, the access and mobility management network element determines that the status of the terminal device in the 3GPP access is the loss-of-connectivity state; otherwise, determines that the status of the terminal device in the 3GPP access is the available-to-connectivity state.

Scenario 2: The access type used by the terminal device to access the network is the non-3GPP access.

In this scenario, the access and mobility management network element may determine a status of the terminal device in the non-3GPP access by using the following feasible implementation. If the terminal device is in an idle state, the access and mobility management network element determines that the status of the terminal device in the non-3GPP access is the loss-of-connectivity state; or if the terminal device is in a connected state, the access and mobility management network element determines that the status of the terminal device in the non-3GPP access is the available-to-connectivity state.

In this scenario, when determining that the status of the terminal device corresponding to the server is the available-to-connectivity state, the access and mobility management network element may alternatively send a first message to the server, where the first message is used to instruct the server to reject setting of maximum detection time.

When determining the status of the terminal device by using the terminal device as the granularity, the access and mobility management network element may determine the status of the terminal device by using the following feasible implementation.

If the access type used by the terminal device to access the network is the 3GPP access or the non-3GPP access, the access and mobility management network element determines that the status of the terminal device in the access type is the status of the terminal device.

If the access type used by the terminal device to access the network is the 3GPP access and the non-3GPP access, the access and mobility management network element determines that the status of the terminal device is the available-to-connectivity state when the terminal device in the 3GPP access and/or the non-3GPP access is in the available-to-connectivity state.

If the access type used by the terminal device to access the network is the 3GPP access and the non-3GPP access, the access and mobility management network element determines that the status of the terminal device is the loss-of-connectivity state when the terminal device in both the 3GPP access and the non-3GPP access is in the loss-of-connectivity state.

When determining the status of the terminal device by using the server as the granularity, the access and mobility management network element may determine the status of the terminal device by using the following feasible implementation.

If the access type used by the terminal device to access the network is the 3GPP access or the non-3GPP access, the access and mobility management network element determines that the status of the terminal device in the access type is the status of the terminal device.

If the access type used by the terminal device to access the network includes the 3GPP access and the non-3GPP access and the type used by the terminal device to access the server is the 3GPP access, the access and mobility management network element determines that the status of the terminal device in the 3GPP access is the loss-of-connectivity state when the terminal device is in the mobile initiated connection only (MICO) mode and the idle state, or the terminal device is located in the restricted service area.

If the access type used by the terminal device to access the network is the 3GPP access and the non-3GPP access and the access type used by the terminal device to access the server is the non-3GPP access, the access and mobility management network element determines that the status of the terminal device corresponding to the server is the available-to-connectivity state when the terminal device is in the connected state; the access and mobility management network element determines that the status of the terminal device corresponding to the server is the loss-of-connectivity state when the terminal device is in the idle state; the access and mobility management network element determines that the status of the terminal device corresponding to the server is the available-to-connectivity state when the terminal device is in the idle state and the terminal device can access the server by using a 3GPP technology; or the access and mobility management network element determines that the status of the terminal device corresponding to the server is the loss-of-connectivity state when the terminal device is in the idle state and the terminal device cannot access the server by using a 3GPP technology. In one embodiment, after determining that the terminal device is in the idle state and determining that the terminal device can access the server by using the 3GPP, the access and mobility management network element may alternatively receive maximum detection time sent by a server corresponding to the server, and update a timer based on the maximum detection time.

In another embodiment, before obtaining the access type used by the terminal device to access the network, the access and mobility management network element may alternatively receive identification information of the server that is sent by the server, the network exposure function network element, or the policy control function network element.

In another embodiment, after determining, based on the status of the terminal device in the access type, the status of the terminal device, the access and mobility management network element sends the status of the terminal device to the server; or the access and mobility management network element sends, to the server, the status of the terminal device and the access type used by the terminal device to access the server.

According to a second aspect, an embodiment of the present disclosure provides a method for determining a status of a terminal device. The method includes: sending, by a server, a request message to an access and mobility management network element, where the request message is used to request a status of the terminal device corresponding to the server; and/or receiving, by the server, a response message sent by the access and mobility management network element, where the response message includes the status of the terminal device corresponding to the server.

In one embodiment, the request message may include identification information of the terminal device and identification information of the server.

In the foregoing process, when the server needs to obtain the status of the terminal device, the server may obtain the status of the terminal device from the access and mobility management network element, so that the server can quickly and easily obtain the status of the terminal device.

According to a third aspect, an embodiment of the present disclosure provides a method for determining a status of a terminal device. The method may include: obtaining, by an access and mobility management network element, first information of the terminal device, where the first information includes at least one of location information of the terminal device and a protocol data unit (PDU) session state of the terminal device in a local area data network (LADN); and determining, by the access and mobility management network element, the status of the terminal device based on the first information, where the status includes at least one of a loss-of-connectivity state and an available-to-connectivity state.

In the foregoing process, because the first information includes at least one of a location of the terminal device and a PDU session of the terminal device in the LADN, the access and mobility management network element can accurately determine the status of the terminal device based on the location of the terminal device or the PDU session state of the terminal device in the LADN.

In one embodiment, the access and mobility management network element determines a server accessed by the terminal device. If a data network corresponding to the server is the LADN, the access and mobility management network element determines the status of the terminal device based on the location information of the terminal device and a service area of the LADN.

In one embodiment, the access and mobility management network element may obtain data network DN information from a network device, and determine, based on the DN information, whether the data network corresponding to the server is the LADN.

In one embodiment, the network device may be at least one of an NEF device, a PCF device, or an SMF device.

It should be noted that if the data network corresponding to the server is not the LADN, the status of the terminal device may be determined by using the method according to any one of the foregoing first aspect.

When the status of the terminal device is determined based on the location information of the terminal device, the access and mobility management network element obtains the service area of the LADN. If the terminal device is located within the service area of the LADN, the access and mobility management network element determines that the status of the terminal device is the available-to-connectivity state; or if the terminal device is located outside the service area of the LADN, the access and mobility management network element determines that the status of the terminal device is the loss-of-connectivity state.

When a connection status of the terminal device is determined based on the PDU session state of the terminal device in the LADN, if the PDU session state of the terminal device in the LADN is an available state, the access and mobility management network element determines that the status of the terminal device is the available-to-connectivity state; or if the PDU session state of the terminal device in the LADN is an unavailable state, the access and mobility management network element determines that the status of the terminal device is the loss-of-connectivity state.

According to a fourth aspect, an embodiment of the present disclosure provides a method for determining an access type. The method includes: obtaining, by a terminal device, access types supported by the server; determining, by the terminal device, an access type used to access the server among the access types supported by the server; and sending, by the terminal device to the network device, an access type used by the terminal device to access the server.

In the foregoing process, the terminal device may determine the access type used to access the server, and send, to another network device, the access type used to access the server. In this way, the another network device may directly use the access type that is determined by the terminal device and that is used to access the server.

In one embodiment, the network device includes any one of a server, an access and mobility management network element, a policy control function network element, a network exposure function network element, and a database.

In one embodiment, the terminal device may alternatively obtain a priority of the access types supported by the server, and determine, based on the priority, the access type used by the terminal device to access the server.

In one embodiment, the terminal device may receive a priority sent by the policy control function network element.

In one embodiment, the terminal device may obtain, by using at least the following two feasible implementations, the access types supported by the server.

Manner 1:

The terminal device receives the access types that are used by the terminal device and that are supported by the server, where the access types are sent by the network device.

In one embodiment, before receiving the access type sent by the network device, the terminal device may alternatively send an obtaining request to the network device.

Manner 2:

The terminal device determines the access types that are used by the terminal device and that are supported by the server.

According to a fifth aspect, an embodiment of the present disclosure provides a method for obtaining an access type. The method may include: receiving, by a first network element, an access type that is sent by another network element and that is used by a terminal device to access a server.

In one embodiment, before receiving the access type that is sent by the another network element and that is used by the terminal device to access the server, the first network element may alternatively send a request message to the another network element, where the request message is used to request to obtain the access type used by the terminal device to access the server.

In the foregoing process, when the first network element needs to obtain the access type used by the terminal device to access the server, the first network element may obtain the access type directly from the another network element, so that the first network element can quickly obtain the access type used by the terminal device to access the server.

In one embodiment, the first network element may alternatively receive priority information of the access type sent by the another network element.

In one embodiment, the first network element is an access and mobility management network element, and the another network element includes at least one of a control function network element, a network exposure function network element, a server, a database, and a terminal device.

In one embodiment, when the first network element is the access and mobility management network element, the another network element is the terminal device and the access type used by the terminal device to access the server is an access type that is determined by the terminal device and that is used to access the server.

In one embodiment, the first network element includes the access and mobility management network element, the policy control function network element, the network exposure function network element, or the terminal device.

According to a sixth aspect, an embodiment of the present disclosure provides an apparatus for determining a status of a terminal device. The apparatus includes an obtaining module and a first determining module.

The obtaining module is configured to obtain an access type used by the terminal device to access a network, where the access type includes at least one of 3rd generation partnership project (3GPP) access and non-3GPP access.

The first determining module is configured to determine, based on a status of the terminal device in the access type, the status of the terminal device, where the status of the terminal device includes at least one of a loss-of-connectivity state and an available-to-connectivity state.

In one embodiment, the obtaining module is specifically configured to:

determine a server accessed by the terminal device; and obtain an access type used by the terminal device to access the server.

In another embodiment, the first determining module is specifically configured to:

determine, based on the status of the terminal device in the access type, a status of the terminal device corresponding to the server.

In another embodiment, the obtaining module is specifically configured to:

receive the access type that is sent by a network device and that is used by the terminal device to access the network, where the network device includes at least one of a server, a network exposure function network element, a policy control function network element, and a database.

In another embodiment, the apparatus further includes a sending module.

The sending module is configured to send identification information of the terminal device to the network device before the obtaining module receives the access type that is sent by the network device and that is used by the terminal device to access the network.

In another embodiment, the first determining module is specifically configured to:

determine that the status of the terminal device in the access type is the status of the terminal device if the access type used by the terminal device to access the network is the 3GPP access or the non-3GPP access;

when the terminal device in the 3GPP access and/or the non-3GPP access is in the available-to-connectivity state, determine that the status of the terminal device is the available-to-connectivity state if the access type used by the terminal device to access the network is the 3GPP access and the non-3GPP access; or when the terminal device in both the 3GPP access and the non-3GPP access is in the loss-of-connectivity state, determine that the status of the terminal device is the loss-of-connectivity state if the access type used by the terminal device to access the network is the 3GPP access and the non-3GPP access.

In another embodiment, the apparatus further includes a second determining module.

The second determining module is configured to determine the status of the terminal device in the access type before the first determining module determines, based on the status of the terminal device in the access type, the status of the terminal device.

In another embodiment, the access type used by the terminal device to access the network is the 3GPP access, and the second determining module is specifically configured to:

determine that a status of the terminal device in the 3GPP access is the loss-of-connectivity state if the terminal device is in a mobile initiated connection only (MICO) mode and an idle state or if the terminal device is located in a restricted service area.

In another embodiment, the access type used by the terminal device to access the network is the non-3GPP access, and the second determining module is specifically configured to:

determine that a status of the terminal device in the non-3GPP access is the loss-of-connectivity state if the terminal device is in an idle state; or determine that a status of the terminal device in the non-3GPP access is the available-to-connectivity state if the terminal device is in a connected state.

In another embodiment, the sending module is further configured to send a first message to the server when determining that the access type used by the terminal device to access the network is the non-3GPP access, and determining that the status of the terminal device corresponding to the server is the available-to-connectivity state, where the first message is used to instruct the server to reject setting of maximum detection time.

In another embodiment, the access type used by the terminal device to access the network includes the 3GPP access and the non-3GPP access, and the type used by the terminal device to access the server is the 3GPP access. The first determining module is specifically configured to:

determine that a status of the terminal device in the 3GPP access is the loss-of-connectivity state if the terminal device is in a mobile initiated connection only (MICO) mode and an idle state or if the terminal device is located in a restricted service area.

In another embodiment, the access type used by the terminal device to access the network is the 3GPP access and the non-3GPP access, and the access type used by the terminal device to access the server is the non-3GPP access. The first determining module is specifically configured to:

determine that the status of the terminal device corresponding to the server is the available-to-connectivity state when the terminal device is in a connected state;

determine that the status of the terminal device corresponding to the server is the loss-of-connectivity state when the terminal device is in an idle state;

determine that the status of the terminal device corresponding to the server is the available-to-connectivity state when the terminal device is in an idle state and the terminal device can access the server by using a 3GPP technology; or determine that the status of the terminal device corresponding to the server is the loss-of-connectivity state when the terminal device is in an idle state and the terminal device cannot access the server by using a 3GPP technology.

In another embodiment, the apparatus further includes a receiving module and an update module.

The receiving module is configured to receive maximum detection time sent by a server corresponding to the server when the access type used by the terminal device to access the network is the 3GPP access and the non-3GPP access, the access type used by the terminal device to access the server is the non-3GPP access, the terminal device is in an idle state, and the terminal device can access the server by using the 3GPP.

The update module is configured to update a timer based on the maximum detection time.

In another embodiment, the receiving module is further configured to:

receive, before the obtaining module obtains the access type used by the terminal device to access the network, identification information of the server that is sent by the server, the network exposure function network element, or the policy control function network element.

In another embodiment, the sending module is further configured to send, to the server after the first determining module determines, based on the status of the terminal device in the access type, the status of the terminal device, the status of the terminal device or the status of the terminal device and the access type used by the terminal device to access the server.

The apparatus for determining the status of the terminal device provided in this embodiment of the present disclosure can perform the method according to any one of the foregoing first aspect. Implementation principles and beneficial effects thereof are similar, and details are not described herein again.

According to a seventh aspect, an embodiment of the present disclosure provides an apparatus for determining a status of a terminal device. The apparatus includes a sending module and a receiving module.

The sending module is configured to send a request message to an access and mobility management network element, where the request message is used to request a status of the terminal device corresponding to the server.

The receiving module is configured to receive a response message sent by the access and mobility management network element, where the response message includes the status of the terminal device corresponding to the server.

In one embodiment, the request message includes identification information of the terminal device and identification information of the server.

The apparatus for determining the status of the terminal device provided in this embodiment of the present disclosure can perform the method according to any one of the foregoing second aspect. Implementation principles and beneficial effects thereof are similar, and details are not described herein again.

According to an eighth aspect, an embodiment of the present disclosure provides an apparatus for determining a status of a terminal device. The apparatus includes an obtaining module and a determining module.

The obtaining module is configured to obtain first information of the terminal device, where the first information includes at least one of location information of the terminal device and a protocol data unit (PDU) session state of the terminal device in a local area data network (LADN).

The determining module is configured to determine the status of the terminal device based on the first information, where the status includes at least one of a loss-of-connectivity state and an available-to-connectivity state.

In one embodiment, the determining module is specifically configured to:
determine a server accessed by the terminal device; and
determine the status of the terminal device based on the location information of the terminal device and a service area of the LADN if a data network corresponding to the server is the LADN.

In another embodiment, the determining module is specifically configured to:
obtain the service area of the LADN; and
determine that the status of the terminal device is the available-to-connectivity state if the terminal device is located within the service area of the LADN; or
determine that the status of the terminal device is the loss-of-connectivity state if the terminal device is located outside the service area of the LADN.

In another embodiment, the determining module is specifically configured to:
determine that the status of the terminal device is the available-to-connectivity state if the PDU session state of the terminal device in the local data network is an available state; or
determine that the status of the terminal device is the loss-of-connectivity state if the PDU session state of the terminal device in the local data network is an unavailable state.

The apparatus for determining the status of the terminal device provided in this embodiment of the present disclosure can perform the method according to any one of the foregoing third aspect. Implementation principles and beneficial effects thereof are similar, and details are not described herein again.

According to a ninth aspect, an embodiment of the present disclosure provides an apparatus for determining an access type. The apparatus includes an obtaining module, a determining module, and a sending module.

The obtaining module is configured to obtain access types supported by a server.

The determining module is configured to determine an access type used to access the server among the access types supported by the server.

The sending module is configured to send, to a network device, the access type used by the terminal device to access the server.

In one embodiment, the determining module is specifically configured to:
obtain a priority of the access types supported by the server; and
determine, based on the priority, the access type used by the terminal device to access the server.

In another embodiment, the obtaining module is specifically configured to:
receive the priority sent by a policy control function network element.

In another embodiment, the network device includes any one of a server, an access and mobility management network element, a policy control function network element, a network exposure function network element, and a database.

In another embodiment, the obtaining module is specifically configured to:
receive the access types that are used by the terminal device and that are supported by the server, where the access types are sent by the network device.

In another embodiment, the obtaining module is specifically configured to:
determine the access types that are used by the terminal device and that are supported by the server.

The apparatus for determining the status of the terminal device provided in this embodiment of the present disclosure can perform the method according to any one of the foregoing fourth aspect. Implementation principles and beneficial effects thereof are similar, and details are not described herein again.

According to a tenth aspect, an embodiment of the present disclosure provides an apparatus for obtaining an access type. The apparatus includes a receiving module.

The receiving module is configured to receive an access type that is sent by another network element and that is used by a terminal device to access a server.

In one embodiment, the apparatus further includes a sending module.

The sending module is configured to send a request message to the another network element before the receiving module receives the access type that is sent by the another network element and that is used by the terminal device to access the server, where the request message is used to request to obtain the access type used by the terminal device to access the server.

In another embodiment, the receiving module is further configured to receive priority information of the access type sent by the another network element.

In another embodiment, the first network element is an access and mobility management network element, and the another network element includes at least one of a control function network element, a network exposure function network element, a server, a database, and a terminal device.

In another embodiment, the first network element is an access and mobility management network element, the another network element is a terminal device, and the access type used by the terminal device to access the server is an access type that is determined by the terminal device and that is used to access the server.

In another embodiment, the first network element includes an access and mobility management network element, a policy control function network element, a network exposure function network element, or a terminal device.

The apparatus for determining the status of the terminal device provided in this embodiment of the present disclosure can perform the method according to any one of the foregoing fifth aspect. Implementation principles and beneficial effects thereof are similar, and details are not described herein again.

According to an eleventh aspect, an embodiment of the present disclosure provides a network device. The network device includes a processor, a memory, and a communications bus. The communications bus is configured to implement a connection between components. The memory is configured to store a program instruction. The processor is configured to: read the program instruction in the memory and perform, based on a program in the memory, the following operations:

obtaining an access type used by the terminal device to access a network, where the access type includes at least one of 3rd generation partnership project (3GPP) access and non-3GPP access; and determining, based on a status of the terminal device in the access type, a status of the terminal device, where the status of the terminal device includes at least one of a loss-of-connectivity state and an available-to-connectivity state.

In one embodiment, the processor is specifically configured to:

determine a server accessed by the terminal device; and obtain an access type used by the terminal device to access the server.

In another embodiment, the processor is specifically configured to:

determine, based on the status of the terminal device in the access type, a status of the terminal device corresponding to the server.

In another embodiment, the network device further includes a receiver, where the receiver is configured to receive an access type that is sent by the network device and that is used by the terminal device to access the network, where the network device includes at least one of a server, a network exposure function network element, a policy control function network element, and a database.

In another embodiment, the apparatus further includes a transmitter.

The transmitter is configured to send identification information of the terminal device to the network device before the receiver receives the access type that is sent by the network device and that is used by the terminal device to access the network.

In another embodiment, the processor is specifically configured to:

determine that the status of the terminal device in the access type is the status of the terminal device if the access type used by the terminal device to access the network is the 3GPP access or the non-3GPP access;

when the terminal device in the 3GPP access and/or the non-3GPP access is in the available-to-connectivity state, determine that the status of the terminal device is the available-to-connectivity state if the access type used by the terminal device to access the network is the 3GPP access and the non-3GPP access; or when the terminal device in both the 3GPP access and the non-3GPP access is in the loss-of-connectivity state, determine that the status of the terminal device is the loss-of-connectivity state if the access type used by the terminal device to access the network is the 3GPP access and the non-3GPP access.

In another embodiment, the processor is further configured to determine the status of the terminal device in the access type before the processor determines, based on the status of the terminal device in the access type, the status of the terminal device.

In another embodiment, the access type used by the terminal device to access the network is the 3GPP access, and the processor is specifically configured to:

determine that a status of the terminal device in the 3GPP access is the loss-of-connectivity state if the terminal device is in a mobile initiated connection only (MICO) mode and an idle state or if the terminal device is located in a restricted service area.

In another embodiment, the access type used by the terminal device to access the network is the non-3GPP access, and the processor is specifically configured to:

determine that a status of the terminal device in the non-3GPP access is the loss-of-connectivity state if the terminal device is in an idle state; or determine that a status of the terminal device in the non-3GPP access is the available-to-connectivity state if the terminal device is in a connected state.

In another embodiment, the transmitter is further configured to send a first message to the server when determining that the access type used by the terminal device to access the network is the non-3GPP access, and determining that the status of the terminal device corresponding to the server is the available-to-connectivity state, where the first message is used to instruct the server to reject setting of maximum detection time.

In another embodiment, the access type used by the terminal device to access the network includes the 3GPP access and the non-3GPP access, and the type used by the terminal device to access the server is the 3GPP access. The processor is specifically configured to:

determine that a status of the terminal device in the 3GPP access is the loss-of-connectivity state if the terminal device is in a mobile initiated connection only (MICO) mode and an idle state or if the terminal device is located in a restricted service area.

In another embodiment, the access type used by the terminal device to access the network is the 3GPP access and the non-3GPP access, and the access type used by the terminal device to access the server is the non-3GPP access. The processor is specifically configured to:

determine that the status of the terminal device corresponding to the server is the available-to-connectivity state when the terminal device is in a connected state;

determine that the status of the terminal device corresponding to the server is the loss-of-connectivity state when the terminal device is in an idle state;

determine that the status of the terminal device corresponding to the server is the available-to-connectivity state when the terminal device is in an idle state and the terminal device can access the server by using a 3GPP technology; or determine that the status of the terminal device corresponding to the server is the loss-of-connectivity state when the terminal device is in an idle state and the terminal device cannot access the server by using a 3GPP technology.

In another embodiment, the receiver is further configured to receive maximum detection time sent by a server corresponding to the server when the access type used by the terminal device to access the network is the 3GPP access and the non-3GPP access, the access type used by the terminal device to access the server is the non-3GPP access, the terminal device is in an idle state, and the terminal device can access the server by using the 3GPP.

The processor is further configured to update a timer based on the maximum detection time.

In another embodiment, the receiver is further configured to:

receive, before the processor obtains the access type used by the terminal device to access the network, identification information of the server that is sent by the server, the network exposure function network element, or the policy control function network element.

In another embodiment, the transmitter is configured to send, to the server after the processor determines, based on the status of the terminal device in the access type, the status of the terminal device, the status of the terminal device or the status of the terminal device and the access type used by the terminal device to access the server.

The network device provided in this embodiment of the present disclosure can perform the method according to any one of the foregoing first aspect. Implementation principles and beneficial effects thereof are similar, and details are not described herein again.

According to a twelfth aspect, an embodiment of the present disclosure provides a server. The server includes a processor, a memory, a transmitter, a receiver, and a communications bus. The communications bus is configured to implement a connection between components. The memory is configured to store a program instruction. The processor is configured to read and execute the program instruction in the memory.

The transmitter is configured to send a request message to an access and mobility management network element, where the request message is used to request a status of the terminal device corresponding to the server.

The receiver is configured to receive a response message sent by the access and mobility management network element, where the response message includes the status of the terminal device corresponding to the server.

In one embodiment, the request message includes identification information of the terminal device and identification information of the server.

The server provided in this embodiment of the present disclosure can perform the method according to any one of the foregoing second aspect. Implementation principles and beneficial effects thereof are similar, and details are not described herein again.

According to a thirteenth aspect, an embodiment of the present disclosure provides a network device. The network device includes a processor, a memory, and a communications bus. The communications bus is configured to implement a connection between components. The memory is configured to store a program instruction. The processor is configured to: read the program instruction in the memory and perform, based on a program in the memory, the following operations:

obtaining first information of the terminal device, where the first information includes at least one of location information of the terminal device and a protocol data unit (PDU) session state of the terminal device in a local area data network (LADN); and determining a status of the terminal device based on the first information, where the status includes at least one of a loss-of-connectivity state and an available-to-connectivity state.

In one embodiment, the processor is specifically configured to:

determine a server accessed by the terminal device; and determine the status of the terminal device based on the location information of the terminal device and a service area of the LADN if a data network corresponding to the server is the LADN.

In another embodiment, the processor is specifically configured to:

obtain the service area of the LADN; and determine that the status of the terminal device is the available-to-connectivity state if the terminal device is located within the service area of the LADN; or determine that the status of the terminal device is the loss-of-connectivity state if the terminal device is located outside the service area of the LADN.

In another embodiment, the processor is specifically configured to:

determine that the status of the terminal device is the available-to-connectivity state if the PDU session state of the terminal device in the local data network is an available state; or determine that the status of the terminal device is the loss-of-connectivity state if the PDU session state of the terminal device in the local data network is an unavailable state.

The network device provided in this embodiment of the present disclosure can perform the method according to any one of the foregoing third aspect. Implementation principles and beneficial effects thereof are similar, and details are not described herein again.

According to a fourteenth aspect, an embodiment of the present disclosure provides a terminal device. The terminal device includes a processor, a memory, a transmitter, and a communications bus. The communications bus is configured to implement a connection between components. The memory is configured to store a program instruction. The processor is configured to read and execute the program instruction in the memory.

The processor is configured to obtain access types supported by a server.

The processor is configured to determine an access type used to access the server among the access types supported by the server.

The transmitter is configured to send, to a network device, the access type used by the terminal device to access the server.

In one embodiment, the processor is specifically configured to:

obtain a priority of the access types supported by the server; and determine, based on the priority, the access type used by the terminal device to access the server.

In another embodiment, the processor is specifically configured to:

receive the priority sent by a policy control function network element.

In another embodiment, the network device includes any one of a server, an access and mobility management network element, a policy control function network element, a network exposure function network element, and a database.

In another embodiment, the processor is specifically configured to:

receive the access types that are used by the terminal device and that are supported by the server, where the access types are sent by the network device.

In another embodiment, the processor is specifically configured to:

determine the access types that are used by the terminal device and that are supported by the server.

The terminal device provided in this embodiment of the present disclosure can perform the method according to any one of the foregoing fourth aspect. Implementation principles and beneficial effects thereof are similar, and details are not described herein again.

According to a fifteenth aspect, an embodiment of the present disclosure provides a network device. The network device includes a processor, a memory, a receiver, and a communications bus. The communications bus is configured to implement a connection between components. The memory is configured to store a program instruction. The processor is configured to read and execute the program instruction in the memory.

The receiver is configured to receive an access type that is sent by another network element and that is used by a terminal device to access a server.

In one embodiment, the apparatus further includes a transmitter.

The transmitter is configured to send a request message to the another network element before the receiver receives the access type that is sent by the another network element and that is used by the terminal device to access the server, where the request message is used to request to obtain the access type used by the terminal device to access the server.

In another embodiment, the receiver is further configured to receive priority information of the access type sent by the another network element.

In another embodiment, the first network element is an access and mobility management network element, and the another network element includes at least one of a control function network element, a network exposure function network element, a server, a database, and a terminal device.

In another embodiment, the first network element is an access and mobility management network element, the another network element is a terminal device, and the access type used by the terminal device to access the server is an access type that is determined by the terminal device and that is used to access the server.

In another embodiment, the first network element includes an access and mobility management network element, a policy control function network element, a network exposure function network element, or a terminal device.

The network device provided in this embodiment of the present disclosure can perform the method according to any one of the foregoing fifth aspect. Implementation principles and beneficial effects thereof are similar, and details are not described herein again.

According to a sixteenth aspect, the present disclosure provides a computer-readable storage medium. The computer-readable storage medium stores a computer-executable instruction, and when at least one processor of a network device executes the computer-executable instruction, the network device performs the method according to any one of the foregoing aspects.

According to a seventeenth aspect, the present disclosure provides a computer program product. The computer program product includes a computer-executable instruction, and the computer-executable instruction is stored in a computer-readable storage medium. At least one processor of a network device may read the computer-executable instruction from the computer-readable storage medium, and the at least one processor executes the computer-executable instruction, so that the network device performs the method according to any one of the foregoing aspects.

According to an eighteenth aspect, the present disclosure provides a chip system. The chip system includes a processor, configured to support a network device in implementing the function in the foregoing aspects, for example, processing information in the foregoing methods. In a possible design, the chip system further includes a memory. The memory is configured to store a program instruction and data that are appropriate for the network device. The chip system may include a chip, or may include a chip and another discrete device.

The present disclosure provides the method and the apparatus for determining the status of the terminal device, and the device. The terminal device may access the network by using the 3GPP and/or the non-3GPP, and the access and mobility management network element may first obtain the access type used by the terminal device to access the network, and determine, based on the connection status of the terminal device in the access type, the status of the terminal device. Because the status of the terminal device is related to the connection status of the terminal device in the access type, the access and mobility management network element can accurately obtain the status of the terminal device.

DESCRIPTION OF EMBODIMENTS

Figure 1:
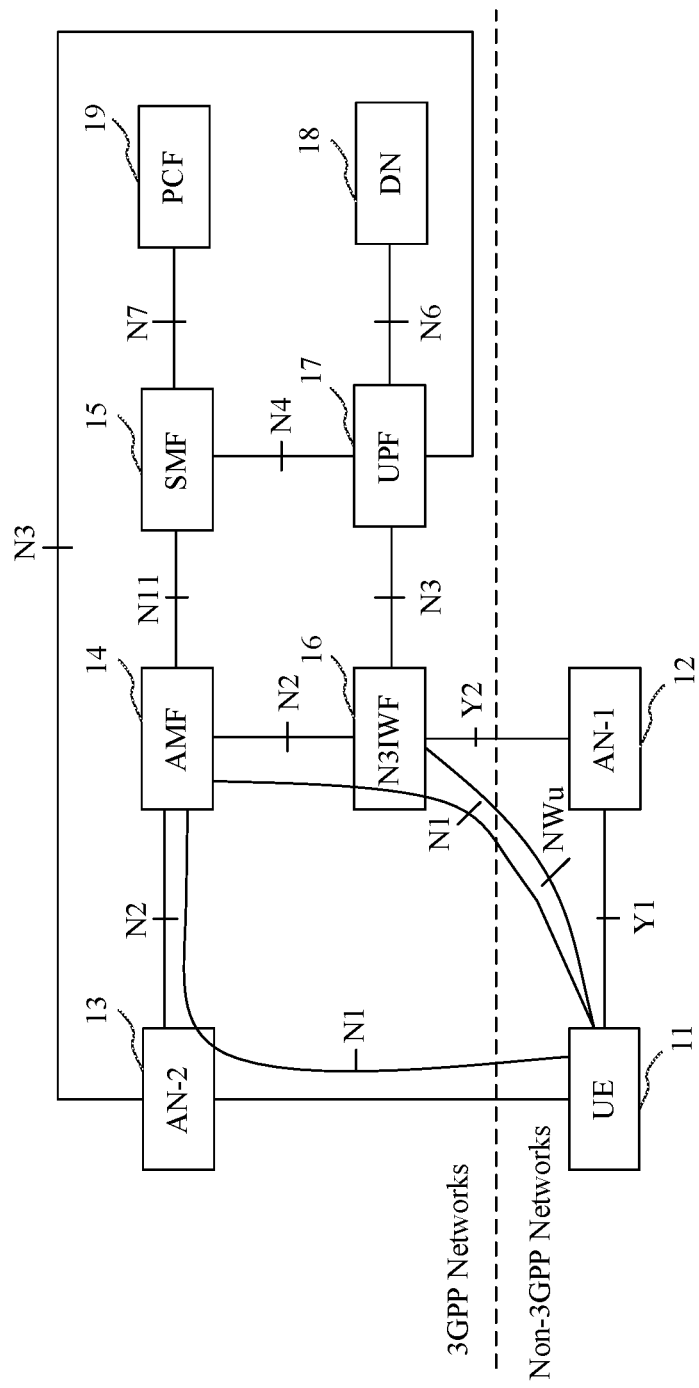
FIG. 1 is an architectural diagram of a communications system according to an embodiment of the present disclosure.

FIG. 1 is an architectural diagram of a communications system according to an embodiment of the present disclosure. The communications system may include a terminal device 11, an access network (AN) node 12 (briefly referred to as AN-1 below) in a non-3rd generation partnership project (3GPP) network, an access network (AN) node 13 (briefly referred to as AN-2 below) in a 3GPP network, an access and mobility management function (AMF) network element 14, a session manage function (SMF) network element 15, a non-3GPP interworking function (N3IWF) network element 16, a user plane function (UPF) network element 17, a data network (DN) 18, and a policy control function (PCF) network element 19.

The terminal device 11 includes but is not limited to: user equipment UE), a subscriber unit, a subscriber station, a mobile station, a mobile, a remote station, a remote terminal device, a mobile terminal device, a user terminal device, a terminal device, a wireless communications device, a user agent, a user apparatus, a cellular phone, a cordless phone, a session initiation protocol (SIP) phone, a wireless local loop (WLL) station, a personal digital assistant (PDA), a handheld device having a wireless communication function, a computing device, a processing device connected to a wireless modem, an in-vehicle device, a wearable device, a terminal device in the Internet of Things, a household appliance, a virtual reality device, a terminal device in a future 5G network, a terminal device in a future evolved public land mobile network (PLMN), and the like.

The AN-1 node 12 may be a device that provides access to the terminal device by using a non-3GPP technology, for example, may be a wireless fidelity access point (WiFi AP).

The AN-2 node 13 may be a device that provides an access network to the terminal device in the 3GPP network, including but not limited to an evolved Node B eNB), a worldwide interoperability for microwave access base station (WiMAX BS), a base station in the 5G network, a subsequent evolved base station, and the like.

The AMF network element 14 may be used for mobility management, such as user location update, registration of a user with a network, and user switching, in a mobile network.

The SMF network element 15 may be used for session management, such as session establishment, session modification, and session release, in the mobile network.

The N3IWF network element 16 may be configured to: establish an IPsec tunnel and terminate an N2 interface and an N3 interface of a control plane and a user plane in an untrusted Non-3GPP access network.

The UPF network element 17 may be configured to process a user packet, for example, forward and collect statistics on packets. The UFP network element 17 further performs a session related policy based on an indication of the SMF.

The PCF network element 19 may be configured to set a policy of the terminal device, such as a quality of service (QoS) policy or a slice selection policy.

It may be understood that functions of constituent network elements in the communications system shown in FIG. 1 are only examples, and not all of the functions are necessary when the constituent network elements are applied to the embodiments of the present disclosure.

The term "and/or" in the embodiments of the present disclosure describes only an association relationship between associated objects and represents that three relationships may exist. For example, A and/or B may represent the following three cases: only A exists, both A and B exist, and only B exists. In addition, in the descriptions of the present disclosure, "a plurality of" means two or more than two.

It should be noted that, in the embodiments of the present disclosure, for any involved first device, second device, and third device, when the first device sends information to the second device, the first device may directly send the information to the second device, or the first device may indirectly send the information to the second device. That the first device indirectly sends the information to the second device means that the first device sends the information to the second device through at least one third device. When the first device sends the information to the second device through the third device, the third device may forward the information, or the third device may perform modification (for example, format modification) on the information, and then send the modified information to the second device, that is, the first device only needs to send, to the second device, the information that needs to be sent, and a sending form is not limited in the present disclosure. In the embodiments of the present disclosure, various network elements and network devices may be entity network elements, or may be functional network elements. This is not limited herein.

In this embodiments of the present disclosure, a status of the terminal device includes an available-to-connectivity state and a loss-of-connectivity state. The available-to-connectivity state may be considered as a state in which the terminal device is reachable, and the loss-of-connectivity state is a state in which the terminal device is unreachable. Specifically, whether the terminal device is reachable refers to whether a communications connection can be established between a network side and the terminal device. If the communications connection can be established, it may be considered that the terminal device is in a reachable state, or if no communications connection can be established, it may be considered that the terminal device is in the loss-of-connectivity state. For example, when the terminal device is in an idle state, the network side may trigger, by using a method such as paging, the terminal device to establish the communications connection with the network side. In this case, it may be considered that the terminal device is in the reachable state. For another example, if the terminal device is in a restricted service area, the network side cannot trigger, by using a signaling process such as paging, the terminal device to establish the communications connection. In this case, it may be considered that the terminal device is in the loss-of-connectivity state. In an actual application process, the terminal device may access a network by using a 3GPP and/or a non-3GPP, and an access and mobility management network element (for example, the AMF network element 14 in FIG. 1) may obtain an access type used by the terminal device to access the network, and determine, based on a status of the terminal device in the access type, the status of the terminal device. Specifically, a connection status of the terminal device in the access type may be a connection management state.

In the embodiments of the present disclosure, the status of the terminal device includes a state using the terminal device as a granularity and a state using the server as a granularity.

In the following description, the technical solutions shown in the present disclosure are described in detail by using specific embodiments. It should be noted that the following several specific embodiments may be combined with each other, and same or similar content may not be described repeatedly in different embodiments.

Figure 2:
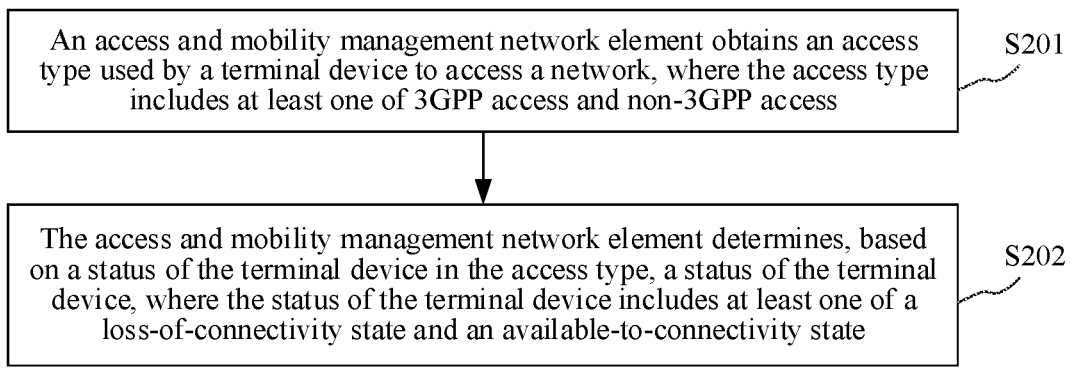
FIG. 2 is a flowchart of a method for determining a status of a terminal device according to a first embodiment of the present disclosure.

FIG. 2 is a flowchart of a method for determining a status of a terminal device according to a first embodiment of the present disclosure. Referring to FIG. 2, the method may include the following operations.

Operation S201: An access and mobility management network element obtains an access type used by a terminal device to access a network, where the access type includes at least one of 3GPP access and non-3GPP access.

In one embodiment, the access and mobility management network element may obtain the status of the terminal device in real time or periodically.

In one embodiment, the access and mobility management network element may alternatively obtain the status of the terminal device after receiving a request of a server (a server accessed by the terminal device). In one embodiment, the access and mobility management network element may directly receive the request sent by the server, or may indirectly receive the request sent by the server. When a request message sent by the server is received indirectly, the server may send a first message to a network device, and the network device may send a second message to the access and mobility management network element. The first message and the second message may include different information, and may be considered as the request message of the server received by the access and mobility management network element provided that the first message and the second message are used to obtain information about the status of the terminal device.

Certainly, the access and mobility management network element may alternatively obtain the status of the terminal device under another condition. A moment at which the access and mobility management network element obtains the status of the terminal device is not specifically limited in the present disclosure.

In one embodiment, the server in the present disclosure may be a service capability server (SCS) or an application server (AS). Certainly, in an actual application process, the server may also be another device. This is not specifically limited in the present disclosure.

In one embodiment, the access and mobility management network element may obtain the access type used by the terminal device to access the network by using at least the following two feasible implementations.

Manner 1: Obtain an access type used by the terminal device to access the server by using the server as a granularity.

The access and mobility management network element determines the server accessed by the terminal device, and obtains the access type used by the terminal device to access the server. In one embodiment, the access type used by the terminal device to access the server may be the access type used by the terminal device to access the network.

The access type used by the terminal device to access the server is a type of an access technology through which control plane signaling or user plane data is transmitted when a control plane connection and/or a user plane connection are/is established between the terminal device and the server.

In one embodiment, the access and mobility management network element may obtain a correspondence between the server and the access type. The access and mobility management network element may obtain, based on the correspondence, the access type used to access the server.

The access and mobility management network element receives an access type that is sent by the network device and that is used by the terminal device to access the server. Alternatively, the access and mobility management network element sends identification information of the terminal device to the network device, and receives the access type that is sent by the network device and that is used by the terminal device to access the server. In one embodiment, the access and mobility management network element may directly interact with the network device, or may interact with the network device through another network element. This is not specifically limited in the present disclosure.

In one embodiment, the access and mobility management network element may obtain information about the server accessed by the terminal device in a device such as a PCF network element, a network exposure function (NEF) network element, the terminal device, or a database. Specifically, the information about the server may be an application identifier of the server, address information of the server, or the like. For example, the database may be a unified data manager (UDM) network element.

In one embodiment, the access and mobility management network element may obtain the access technology type used by the terminal device to access the server in a device such as the PCF network element, the NEF network element, the terminal device, or the database. For example, the database may be the UDM network element.

In an actual application process, the terminal device may access a plurality of servers, and access types used by the terminal device to access different servers may be the same or different.

In another embodiment, the access and mobility management network element obtains access types used by the terminal device to access the servers, and determines a union set of the access types used by the terminal device to access the servers as the access type used by the terminal device to access the network.

The following is described by using a server 1 to a server 4 as an example.

It is assumed that the terminal device simultaneously accesses the server 1 to the server 4.

Assuming that the terminal device accesses the server 1 to the server 4 by using a 3GPP technology separately, it may be determined that the access type used by the terminal device to access the network is the 3GPP access.

Assuming that the terminal device accesses the server 1 to the server 4 by using a non-3GPP technology separately, it may be determined that the access type used by the terminal device to access the network is the non-3GPP access.

Assuming that the terminal device accesses the server 1 by using a 3GPP technology and accesses the server 2 to the server 4 by using a non-3GPP technology separately, it may be determined that the access type used by the terminal device to access the network is the 3GPP access and the non-3GPP access.

Assuming that the terminal device accesses the server 1 by using a 3GPP technology and a non-3GPP technology simultaneously, it may be determined that the access type used by the terminal device to access the network is the 3GPP access and the non-3GPP access.

In a yet another feasible implementation, the access and mobility management network element receives an access type that is sent by the terminal device and that is used by the terminal device to access the server.

In one embodiment, the access and mobility management network element may send a fourth request message to the terminal device. The fourth request message is used to request to obtain the access type used by the terminal device to access the server. For example, the fourth request message may be used to request an access type allowed by the terminal device to be used to access the server. Specifically, the fourth request message may include identification information of the server, for example, an SCS/AS identifier. In one embodiment, the fourth request message may further include indication information, and the terminal device determines, based on the indication information, to send the access technology type to the access and mobility management network element, where the access technology type is allowed by the terminal device to be used to access the server. Alternatively, the terminal device determines, based on the fourth request message, to send the access technology type to the access and mobility management network element, where the access technology type is allowed by the terminal to be used to access the server. The message may include identification information of the server, for example, an SCS/AS identifier.

Manner 2: Obtain an access type used by the terminal device to access the network by using the terminal as a granularity.

Because the access and mobility management network element may learn of the access technology by which the terminal device accesses the network, the access and mobility management network element may determine the access type used by the terminal device to access the network. For the manner in which the access and mobility management network element determines the access type used by the terminal device to access the network, refer to the prior art. For example, the access and mobility management network element may determine the access technology by which the terminal device is attached to the network.

Operation S202: The access and mobility management network element determines, based on a status of the terminal device in the access type, a status of the terminal device, where the status of the terminal device includes at least one of a loss-of-connectivity state and an available-to-connectivity state.

In one embodiment, when the terminal device is reachable, it is determined that the status of the terminal device is the available-to-connectivity state. That the terminal device is reachable means that a communications connection can be established between a network side and the terminal device. For example, when the terminal device is in an idle state, the network side may trigger, by using a method such as paging, the terminal device to establish the communications connection with the network side. In this case, it may be determined that the terminal device is reachable.

In one embodiment, when the terminal device is unreachable, it is determined that the status of the terminal device is the loss-of-connectivity state. That the terminal device is unreachable means that the communications connection cannot be established between the network side and the terminal device. For example, when the terminal device is in a restricted service area, the network side cannot trigger, by using a signaling process such as paging, the terminal to establish the communications connection. In this case, it may be determined that the terminal device is unreachable.

In one embodiment, the access and mobility management network element first obtains the status of the terminal device in the access type, and then determines, based on the status of the terminal device in the access type, the status of the terminal device.

In one embodiment, the status of the terminal device may be defined from different granularities. For example, at least the following two feasible definition manners may be included.

In a feasible definition manner, the status of the terminal device is defined by using the terminal device as the granularity.

In an actual application process, the terminal device may access a plurality of servers. When the status of the terminal device is defined by using the terminal device as the granularity, the statuses of the terminal device are the same for all of the servers.

For example, assuming that the terminal device accesses five servers and the status of the terminal device is determined by using the terminal device as the granularity is the loss-of-connectivity state, all of the statuses of the terminal device are the loss-of-connectivity state for the five servers.

In another feasible definition manner, the status of the terminal device is defined by using the server as the granularity.

In an actual application process, the terminal device may access a plurality of servers. When the status of the terminal device is defined by using the server as the granularity, the statuses of the terminal device may be different for different servers.

For example, assuming that the terminal device accesses five servers and the status of the terminal device is determined by using the server as the granularity, the statuses of the terminal device may be different for different servers. For example, for the server 1, the status of the terminal device may be the available-to-connectivity state, and for the server 2, the status of the terminal device may be the loss-of-connectivity state.

In the method for determining the status of the terminal device provided in the embodiments of the present disclosure, the terminal device may access the network by using the 3GPP and/or the non-3GPP, and the access and mobility management network element may first obtain the access type used by the terminal device to access the network, and determine, based on a connection status of the terminal device in the access type, the status of the terminal device. Because the status of the terminal device is related to the connection status of the terminal device in the access type, the access and mobility management network element can accurately obtain the status of the terminal device.

Based on any one of the foregoing embodiments, when the status of the terminal device is determined by using different granularities, manners in which the status of the terminal device is determined may be different. The following describes, in detail, a manner in which the status of the terminal device is determined by using different granularities.

In one embodiment, the method for determining the status of the terminal device by using the terminal device as the granularity may be implemented in the following feasible manners, which, for example, may include at least the following three feasible implementations.

Manner 1:

The access and mobility management network element determines that the status of the terminal device in the access type is the status of the terminal device if the access type used by the terminal device to access the network is the 3GPP access or the non-3GPP access.

In one embodiment, different access types used by the terminal device to access the network indicate different processes of determining the status of the terminal device in the access type. For example, the following two feasible scenarios may be included.

Scenario 1: The access type used by the terminal device to access the network is the 3GPP access.

In this scenario, it may be determined that a connection status of the terminal device in the 3GPP access is the loss-of-connectivity state if the terminal device is in a mobile initiated connection only (MICO) mode and an idle state or if the terminal device is located in a restricted service area.

It should be noted that the connected state and the idle state in the present disclosure are connection management states of the terminal device.

In one embodiment, the access and mobility management network element may determine, based on a capability of the terminal device and policy information of the network side, whether the terminal device is in the MICO mode.

When the terminal device is in the MICO mode and the idle state, the terminal device can only send uplink control signaling or a user plane data packet, and cannot receive downlink control signaling or the user plane data packet. When the terminal device is in the MICO mode and the connected state, the terminal device may send an uplink signaling message or establish a user plane data transmission channel by using control signaling, and may receive the downlink control signaling or establish the user plane data transmission channel by using the control signaling.

In one embodiment, the access and mobility management network element may obtain a location of the terminal device, and determine, based on the location of the terminal device, whether the terminal device is located within the restricted service area.

In this scenario, the access type used by the terminal device to access the network is the 3GPP access, and it may be determined that the connection status of the terminal device in the 3GPP access is the status of the terminal device.

Scenario 2: The access type used by the terminal device to access the network is the non-3GPP access.

The access and mobility management network element determines that a connection status of the terminal device in the non-3GPP access is the loss-of-connectivity state if the terminal device is in the idle state; or the access and mobility management network element determines that a connection status of the terminal device in the non-3GPP access is the available-to-connectivity state if the terminal device is in the connected state.

In this scenario, the access type used by the terminal device to access the network is the non-3GPP access, and it may be determined that the status of the terminal device in the non-3GPP access is the status of the terminal device.

Manner 2:

If the access type used by the terminal device to access the network is the 3GPP access and the non-3GPP access, the access and mobility management network element determines that the connection status of the terminal device is the available-to-connectivity state when the terminal device in the 3GPP access and/or the non-3GPP access is in the available-to-connectivity state.

In one embodiment, the connection status of the terminal device in the 3GPP access and the connection status of the terminal device in the non-3GPP access may be obtained in the manner shown in Manner 1. Details are not described herein again.

When the access type used by the terminal device to access the network is the 3GPP access and the non-3GPP access, the access and mobility management network element may determine that the connection status of the terminal device is the available-to-connectivity state provided that the connection status of the terminal device in either access is the available-to-connectivity state.

For example, it is assumed that the access type used by the terminal device to access the network is the 3GPP access and the non-3GPP access. When the terminal device in the 3GPP access is in the available-to-connectivity state and the terminal device in the non-3GPP access is in the loss-of-connectivity state, it may be determined that the status of the terminal device is the available-to-connectivity state. When the terminal device in the 3GPP access is in the loss-of-connectivity state and the terminal device in the non-3GPP access is in the available-to-connectivity state, it may be determined that the status of the terminal device is the available-to-connectivity state. When the terminal device in the 3GPP access is in the available-to-connectivity state and the terminal device in the non-3GPP access is in the available-to-connectivity state, it may also be determined that the status of the terminal device is the available-to-connectivity state.

Manner 3:

If the access type used by the terminal device to access the network is the 3GPP access and the non-3GPP access, the access and mobility management network element determines that the status of the terminal device is the loss-of-connectivity state when the terminal device in both the 3GPP access and the non-3GPP access is in the loss-of-connectivity state.

The connection status of the terminal device in the 3GPP access and the connection status of the terminal device in the non-3GPP access may be obtained in the manner shown in Manner 1. Details are not described herein again.

For example, it is assumed that the access type used by the terminal device to access the network is the 3GPP access and the non-3GPP access. When the terminal device in the 3GPP access is in the loss-of-connectivity state and the terminal device in the non-3GPP access is also in the loss-of-connectivity state, it may also be determined that the status of the terminal device is the loss-of-connectivity state.

In the foregoing process, when the status of the terminal device is determined by using the terminal device as the granularity, the status of the terminal device is determined by integrating a plurality of factors such as the access type used by the terminal device to access the network, a mode of the terminal device (whether the terminal device is in the MICO mode), and the connection management state (the connected state or the idle state) of the terminal device, so that the determined status of the terminal device is more accurate.

In one embodiment, the method for determining the status of the terminal device by using the server as the granularity may be implemented in the following feasible manners, which, for example, may include at least the following three feasible implementations.

Manner 1:

If the access type used by the terminal device to access the network is the 3GPP access or the non-3GPP access, the access and mobility management network element determines that the connection status of the terminal device in the access type is a status of the terminal device corresponding to the server.

It should be noted that the status of the terminal device determined by using the server as the granularity may also be referred to as the status of the terminal device corresponding to the server.

In one embodiment, the server may be any server accessed by the terminal device.

In the embodiments of the present disclosure, when the access type used by the terminal device to access the network includes only the 3GPP, the access type used by the terminal device to access the server is the 3GPP, or when the access type used by the terminal device to access the network includes only the non-3GPP, the access type used by the terminal device to access the server is the non-3GPP.

The access type used by the terminal device to access the server is a type of a network that transmits the control signaling and the data when the terminal device is connected to the server, the control plane, or the user plane.

For the method for determining the status of the terminal device in the access type by using the server as the granularity, refer to the method for determining the status of the terminal device in the access type by using the terminal device as the granularity. Details are not described herein again.

When it is determined that the access type used by the terminal device to access the network is the non-3GPP access and the connection status of the terminal device corresponding to the server is the available-to-connectivity state, the first message may alternatively be sent to the server. The first message is used to instruct the server to reject setting of maximum detection time, and the maximum detection time may be carried in the first message.

Manner 2:

If the access type used by the terminal device to access the network is the 3GPP access and the non-3GPP access, the status of the terminal device corresponding to the server is determined based on at least one of the mode, the connection management state, and the location of the terminal device when the type used by the terminal device to access the server is the 3GPP access.

In one embodiment, if the terminal device is in the MICO mode and the idle state or if the terminal device is located in the restricted service area, the access and mobility management network element determines that the connection status of the terminal device corresponding to the server is the loss-of-connectivity state.

In this manner, the access type used by the terminal device to access the network may be determined by the access and mobility management network element, and the access type used by the terminal device to access the server may be an access type obtained by the access and mobility management network element from another network device.

Manner 3:

If the access type used by the terminal device to access the network is the 3GPP access and the non-3GPP access, the connection status of the terminal device corresponding to the server is determined based on at least one of the connection management state and a migration state of the terminal device when the access type used by the terminal device to access the server is the non-3GPP access.

It should be noted that the migration state shown in this embodiment refers to whether the terminal device can still access the server by using the 3GPP technology when the terminal device accesses the server by using the non-3GPP technology. That is, if a PDU session established when the terminal device establishes a communications connection with the server on a non-3GPP side can be moved into a network on a 3GPP side, it is determined that the migration state of the terminal device is a migratable state; or if a PDU session established when the terminal device establishes a communications connection with the server on a non-3GPP side cannot be moved into a network on a 3GPP side, it is determined that the migration state of the terminal device is a non-migratable state.

In this manner, the access type used by the terminal device to access the network may be determined by the access and mobility management network element, and the access type used by the terminal device to access the server may be an access type obtained by the access and mobility management network element from another network device. When the terminal device is in the connected state, the access and mobility management network element determines that the connection status of the terminal device corresponding to the server is the available-to-connectivity state.

In the non-3GPP access, when the terminal device is in the idle state, the access and mobility management network element determines that the connection status of the terminal device corresponding to the server is the loss-of-connectivity state.

In the non-3GPP access, when the terminal device is in the idle state, the access and mobility management network element determines that the connection status of the terminal device corresponding to the server is the loss-of-connectivity state, or when the terminal device is in the idle state and the access and mobility management network element determines that the terminal device can access the server by using the 3GPP, the access and mobility management network element determines that the connection status of the terminal device corresponding to the server is the available-to-connectivity state. In other words, based on a network policy and/or policy information of the terminal device, and the like, if the PDU session established when the terminal device establishes the communications connection with the server on the non-3GPP side can be moved into the network on the 3GPP side, it may be determined that the connection status of the terminal device corresponding to the server is the available-to-connectivity state. In one embodiment, in this case, maximum detection time sent by a server corresponding to the server may alternatively be received, and a timer is updated based on the maximum detection time.

In the non-3GPP access, when the terminal device is in the idle state and the access and mobility management network element determines that the terminal device cannot access the server by using the 3GPP, the access and mobility management network element determines that the connection status of the terminal device corresponding to the server is the loss-of-connectivity state. In other words, based on a network policy and/or policy information of the terminal device, and the like, if the PDU session established when the terminal device establishes the communications connection with the server on the non-3GPP side cannot be moved into the network on the 3GPP side, it may be determined that the connection status of the terminal device corresponding to the server is the loss-of-connectivity state.

In the foregoing process, when a connection manner of the terminal device is determined by using the server as the granularity, the status of the terminal device corresponding to the server is determined by integrating a plurality of factors such as the access type used by the terminal device to access the network, a mode of the terminal device (whether the terminal device is in the MICO mode), and the connection management state (the connected state or the idle state) of the terminal device, so that the determined status of the terminal device corresponding to the server is more accurate.

Based on any one of the foregoing embodiments, in an actual application process, the access and mobility management network element obtains the status of the terminal device in the following two scenarios. Scenario 1: The access and mobility management network element may actively obtain the status of the terminal device, and send the status of the terminal device to all of the servers accessed by the terminal device. Scenario 2: The access and mobility management network element may alternatively obtain the status of the terminal device after receiving request information sent by the server accessed by the terminal device, and send the status of the terminal device to the server.

In the following description, a method for obtaining the status of the terminal device by using the terminal device as the granularity in Scenario 2 is described in detail by using an embodiment shown in FIG. 3, and a method for obtaining the status of the terminal device by using the server as the granularity in Scenario 2 is described in detail by using an embodiment shown in FIG. 4.

Figure 3:
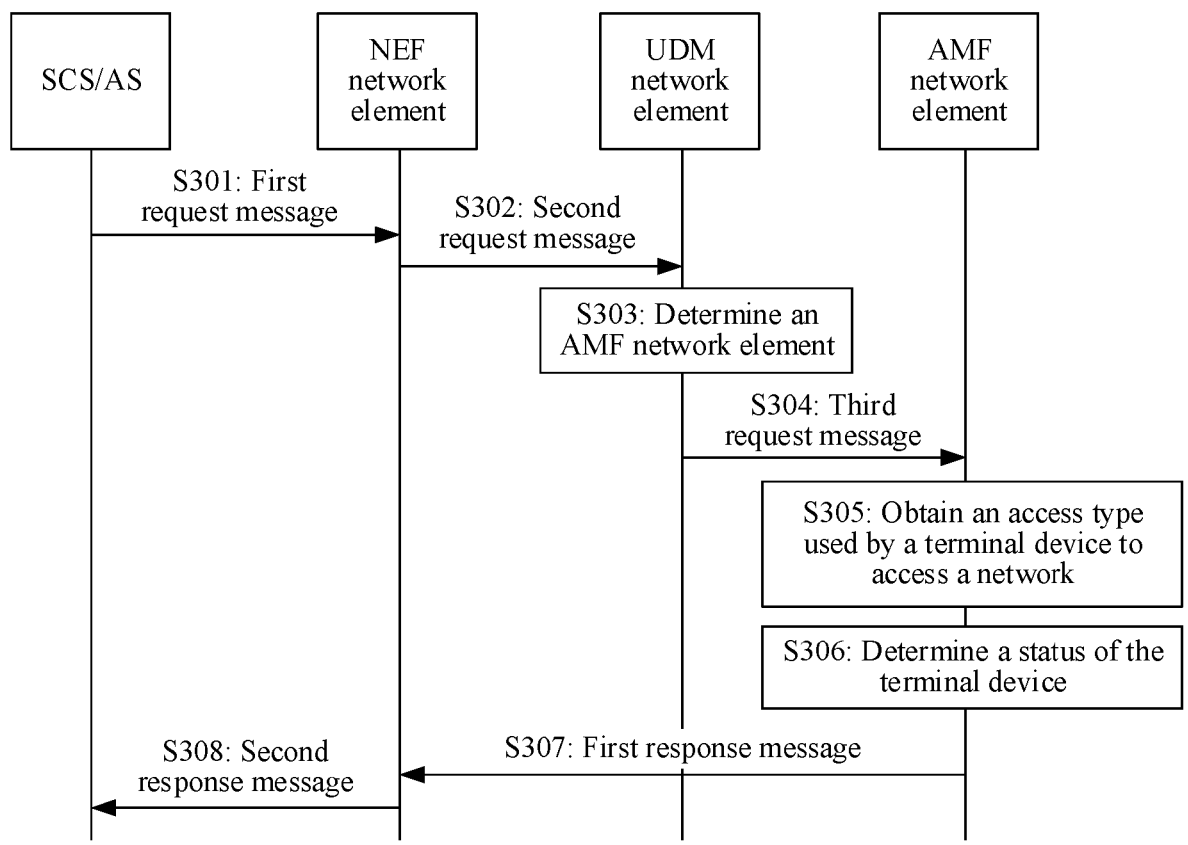
FIG. 3 is a schematic diagram of a method for determining a status of a terminal device by using the terminal device as a granularity according to a second embodiment of the present disclosure.

FIG. 3 is a schematic diagram of a method for determining a status of a terminal device by using the terminal device as a granularity according to a second embodiment of the present disclosure. In the embodiment shown in FIG. 3, description is provided by using an example in which an access and mobility management network element is an AMF network element, a data management network element is a UDM network element, and a server is an SCS/AS. Referring to FIG. 3, the method may include the following operations.

Operation S301: An SCS/AS sends a first request message to an NEF network element, where the first request message is used to request a status of a terminal device.

In one embodiment, the first request message may include at least one of first identification information of the terminal device, a requested event type, and identification information of the SCS/AS.

In one embodiment, the first identification information may be an external identifier of the terminal device. The external identifier is an identifier that is of the terminal device and that can be identified by an application. For example, the external identifier may be an IP address of the terminal device, a permanent equipment identifier (PEI) of the terminal device, or the like. Certainly, in an actual application process, the external identifier of the terminal device may alternatively be identified by another parameter. This is not specifically limited in the embodiments of the present disclosure.

In one embodiment, the requested event type may be a request for obtaining the status of the terminal device.

In one embodiment, an identifier of the SCS/AS may be the identification information of the SCS/AS or an Internet Protocol (IP) address of the SCS/AS.

Operation S302: The NEF network element sends a second request message to a UDM network element, where the second request message is used to request the status of the terminal device.

In one embodiment, the second request message may include at least one of first identification information of the terminal device, a requested event type, identification information of the SCS/AS, and identification information of the NEF network element.

In one embodiment, after receiving the first request message, the NEF network element may determine whether the first request message is legal. If the NEF network element determines that the first request message is illegal, the NEF network element may send a rejection message to the SCS/AS, and carry a rejection cause or the like in the rejection message. For example, the NEF network element may determine, based on information such as a format of the first request message and content included in the first request message, whether the first request message is legal.

Operation S303: The UDM network element determines a corresponding AMF network element based on the second request message.

In one embodiment, after receiving the second request message, the UDM network element may determine whether the second request message is legal. If the UDM network element determines that the second request message is illegal, the UDM network element may send a rejection message to the NEF network element, and carry a rejection cause or the like in the rejection message. For example, the UDM network element may determine, based on information such as a format of the second request message and content included in the second request message, whether the second request message is legal.

In one embodiment, the UDM network element may determine, based on the first identification information of the terminal device in the second request message, the corresponding AMF network element. The AMF network element determined by the UDM network element is an AMF network element capable of providing a service to the terminal device.

Operation S304: The UDM network element sends a third request message to the AMF, where the third request message is used to request the status of the terminal device.

In one embodiment, the third request message includes at least one of second identification information of the terminal device, a requested event type, identification information of the SCS/AS, and identification information of the NEF network element.

In one embodiment, the second identification information may be the same as the first identification information, that is, the UDM network element performs no conversion on the first identification information of the terminal device.

In one embodiment, the second identification information may alternatively be different from the first identification information, and the second identification information may be an intra-network identifier of the terminal device. For example, the intra-network identifier of the terminal device may be a subscriber permanent identifier (SUPI) of the terminal device.

It should be noted that S301 to S304 need to be performed in some application scenarios (for example, a scenario in which the server requests the status of the terminal device), and S301 to S304 are not necessary operations for determining the status of the terminal device. The operations shown in S301 to S304 are merely an example. In another application scenario (for example, a scenario in which the AMF network element actively sends the status of the terminal device), the operations shown in S301 to S304 may be correspondingly changed based on an actual requirement. This is not specifically limited in the embodiments of the present disclosure.

Operation S305: The AMF network element obtains an access type used by the terminal device to access a network.

It should be noted that for a process of performing S305, refer to S201, and details are not described herein again.

Operation S306: The AMF network element determines, based on the access type used by the terminal device to access the network, the status of the terminal device.

It should be noted that, for this operation, refer to the method for determining the status of the terminal device by using the terminal device as the granularity in S202 in the first embodiment of the present disclosure, and details are not described herein again.

Operation S307: The AMF network element sends a first response message to the NEF network element, where the first response message includes the status of the terminal device.

In one embodiment, the first response message may further include the access type used by the terminal device to access the network.

Operation S308: The NEF network element sends a second response message to the SCS/AS, where the second response message includes the status of the terminal device.

In one embodiment, the second response message may further include the access type used by the terminal device to access the network.

S307 to S308 correspond to S301 to S304. It should be noted that S307 to S308 are not necessary operations for determining the status of the terminal device. The operations shown in S307 to S308 are merely an example. In another application scenario, the operations shown in S307 to S308 may be correspondingly changed based on an actual requirement. This is not specifically limited in the embodiments of the present disclosure.

In the embodiment shown in FIG. 3, when the status of the terminal device is determined by using the terminal device as the granularity, the status of the terminal device is determined by integrating a plurality of factors such as the access type used by the terminal device to access the network, a mode of the terminal device (whether the terminal device is in an MICO mode), and a connection management state (a connected state or an idle state) of the terminal device, so that the determined status of the terminal device is more accurate.

Figure 4:
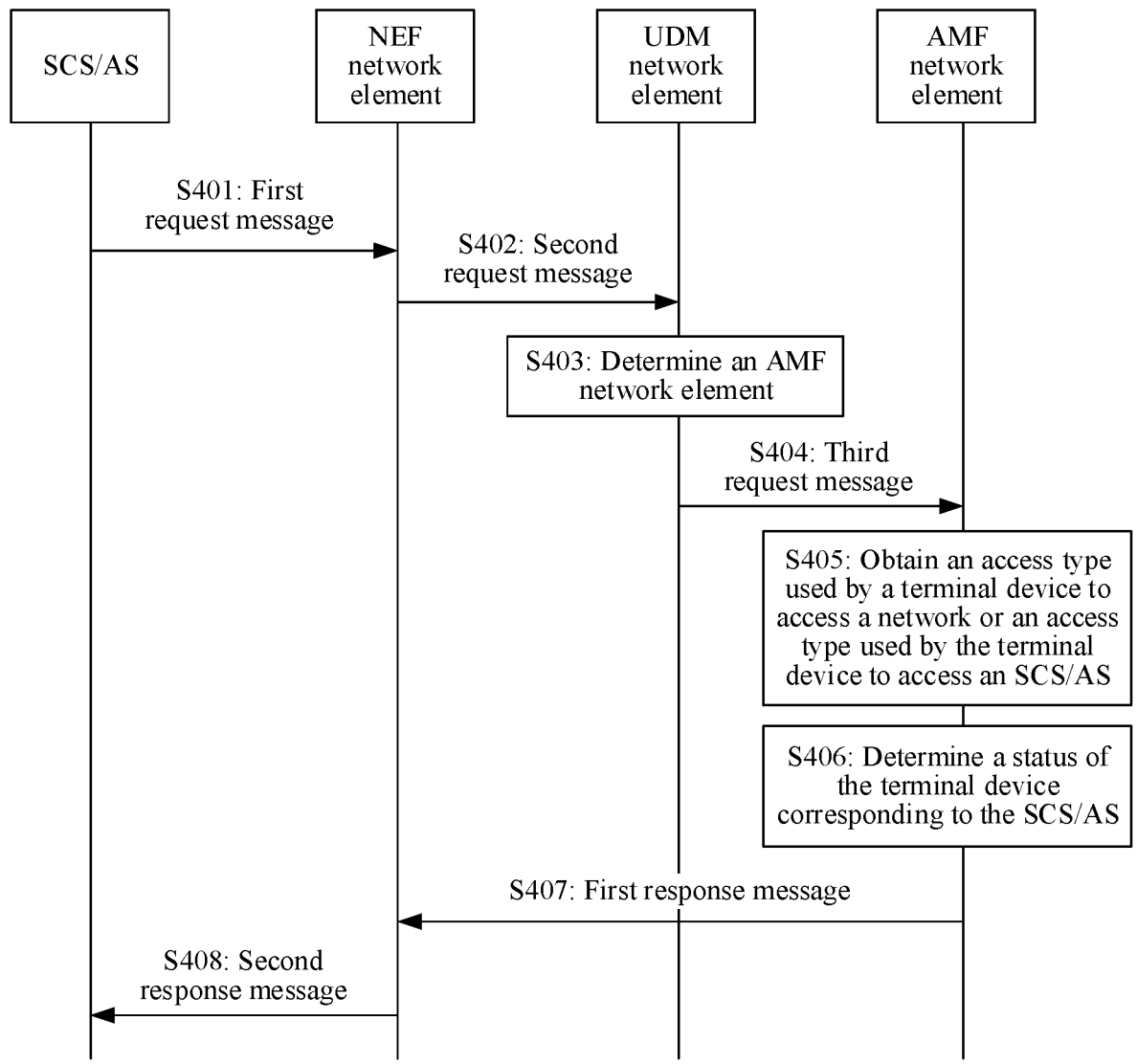
FIG. 4 is a schematic diagram of a method for determining a status of a terminal device by using a server as a granularity according to a third embodiment of the present disclosure.

FIG. 4 is a schematic diagram of a method for determining a status of a terminal device by using a server as a granularity according to a third embodiment of the present disclosure. In the embodiment shown in FIG. 4, description is provided by using an example in which an access and mobility management network element is an AMF network element, a data management network element is a UDM network element, and a server is an SCS/AS. Referring to FIG. 4, the method may include the following operations.

Operation S401: An SCS/AS sends a first request message to an NEF network element, where the first request message is used to request a status of a terminal device corresponding to the SCS/AS.

In one embodiment, the first request message may include at least one of first identification information of the terminal device, a requested event type, identification information of the SCS/AS, and an access type.

In one embodiment, the access type carried in the first request message may be an access type used by the terminal device to establish a communications connection with the SCS/AS, or may be an access type different from an access technology type used by the terminal device to establish a communications connection with the SCS/AS, for example, a status of the terminal device in an access type expected by the SCS/AS. In other words, there may be no correlation between the access type carried by the SCS/AS in the first request message and information of the SCS/AS.

It should be noted that for a process of performing S401, refer to S301, and details are not described herein again.

Operation S402: The NEF network element sends a second request message to a UDM network element, where the second request message is used to request the status of the terminal device corresponding to the SCS/AS.

In one embodiment, the second request message includes at least one of first identification information of the terminal device, a requested event type, identification information of the SCS/AS, identification information of the NEF network element, and an access type.

It should be noted that for a process of performing S402, refer to S302, and details are not described herein again.

It should further be noted that the NEF network element may alternatively obtain an access type used by the terminal device to access the SCS/AS, and the access type used by the terminal device to access the SCS/AS is carried in the second request message. Correspondingly, in S606, the AMF network element may directly obtain, in a received request message, the access type used by the terminal device to access the SCS/AS.

Specifically, the manner in which the NEF network element obtains the access type used by the terminal device to access the SCS/AS is not limited in this embodiment of the present disclosure. The access type used by the terminal device to access the SCS/AS may be obtained by the NEF network element in the received first request message, or may be obtained by the NEF network element from another network device. When the first request message includes the access type, the second request message sent by the NEF network element to the UDM network element may also include the access type. The access technology type information may be different from the access type used by the terminal device to access the SCS/AS.

Operation S403: The UDM network element determines a corresponding AMF network element.

It should be noted that for a process of performing S403, refer to S303, and details are not described herein again.

Operation S404: The UDM network element sends a third request message to the AMF, where the third request message is used to request the status of the terminal device corresponding to the SCS/AS.

In one embodiment, the third request message may include at least one of second identification information of the terminal device, a requested event type, identification information of the SCS/AS, identification information of the NEF network element, and an access type.

It should be noted that for a process of performing S404, refer to S304, and details are not described herein again.

It should further be noted that when the access type used by the terminal device to access the SCS/AS is carried in the second request message, the access type used by the terminal device to access the SCS/AS is also carried in the third request message.

Operation S405: The AMF network element obtains an access type used by the terminal device to access a network or an access type used by the terminal device to access the SCS/AS.

It should be noted that for a process of performing S405, refer to S201, and details are not described herein again.

Operation S406: The AMF network element determines, based on the access type used by the terminal device to access the network or the access type used by the terminal device to access the SCS/AS, the status of the terminal device corresponding to the SCS/AS.

It should be noted that the status of the terminal device corresponding to the SCS/AS may be determined based on the foregoing method for determining the status of the terminal device corresponding to the server by using the server as the granularity, and details are not described herein again.

Operation S407: The AMF network element sends a first response message to the NEF network element, where the first response message includes the status of the terminal device corresponding to the SCS/AS.

In one embodiment, the first response message may further include the access type used by the terminal device to access the SCS/AS.

Operation S408: The NEF network element sends a second response message to the SCS/AS, where the second response message includes the status of the terminal device corresponding to the SCS/AS.

In one embodiment, the second response message may further include the access type used by the terminal device to access the SCS/AS.

In the embodiment shown in FIG. 4, when the status of the terminal device is determined by using the server as the granularity, the status of the terminal device corresponding to the server is determined by integrating a plurality of factors such as the access type used by the terminal device to access the network, a mode of the terminal device (whether the terminal device is in an MICO mode), and a connection management state (a connected state or an idle state) of the terminal device, so that the determined status of the terminal device corresponding to the server is more accurate.

In the embodiment shown in FIG. 4, the terminal device may determine the access type used by the terminal device to access the server (the following is described by using an example in which the server is the SCS/AS), and the access type used by the terminal device to access the SCS/AS is stored in a corresponding network device, so that the AMF network element can obtain, in the corresponding network device, the access type used by the terminal device to access the SCS/AS.

Figure 5:
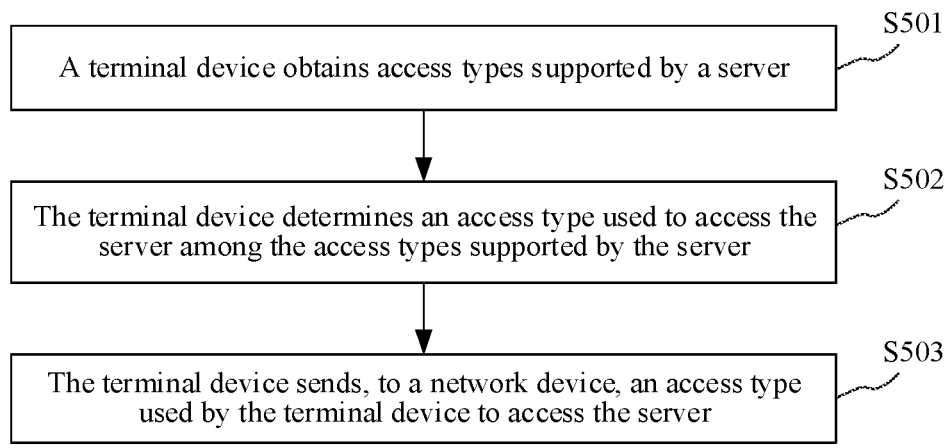
FIG. 5 is a first schematic diagram of a method for determining an access type according to the third embodiment of the present disclosure.

FIG. 5 is a first schematic diagram of a method for determining an access type according to the third embodiment of the present disclosure. Referring to FIG. 5, the method may include the following operations.

Operation S501: A terminal device obtains access types supported by a server.

In one embodiment, a network device includes any one of a server, an access and mobility management network element, a policy control function network element, a network exposure function network element, and a database.

In one embodiment, the access types that are used by the terminal device and that are supported by the server include 3GPP access and/or non-3GPP access.

In one embodiment, the terminal device may obtain, by using at least the following two feasible implementations, the access types supported by the server.

Manner 1: The terminal device receives access types that are sent by the network device and that are supported by the server.

In one embodiment, when the terminal device is registered with a network or in another signaling process, the network device may send, to the terminal device, the access types that are used by the terminal device and that are supported by the server.

In one embodiment, when the terminal device needs to obtain the access types supported by the server, the terminal device may alternatively send a request message to the network device, so that the network device sends, to the terminal device, the access types that are used by the terminal device and that are supported by the server.

Manner 2: The terminal device determines the access types that are used by the terminal device and that are supported by the server.

Operation S502: The terminal device determines an access type used to access the server among the access types supported by the server.

In one embodiment, the terminal device may determine an access type corresponding to the server by using the following feasible implementation. The terminal device obtains a priority of the access types supported by the server, and determines, based on the priority, the access type used by the terminal device to access the server.

In one embodiment, the terminal device may receive a priority sent by the policy control function network element. For example, when the terminal device is registered with a network or in another signaling process, the policy control function network element may send, to the terminal device, the priority of the access types. Alternatively, the terminal device may send request information to the policy control function network element, so that the policy control function network element sends the priority of the access types to the terminal device.

In one embodiment, the terminal device may determine an access type with a high priority as the access type used by the terminal device to access the server.

In an actual application process, the terminal device may alternatively select, based on an actual requirement, the access type used to access the server. For example, a user may configure, in the terminal device, the access type used to access the server. Correspondingly, the terminal device may determine the access type configured by the user as the access type used to access the server.

Operation S503: The terminal device sends, to a network device, an access type used by the terminal device to access the server.

It should be noted that the terminal device may actively send, to the network device after determining the access type used to access the server, the access type used to access the server, or the terminal device may send, to the network device after receiving the request message sent by the network device, the access type used to access the server.

In one embodiment, after the network device receives the access type that is sent by the terminal device and that is used to access the server, the access type used by the terminal device to access the server may be stored, or the access type used by the terminal device to access the server may be sent to another network device.

In the embodiment shown in FIG. 5, the terminal device may select, based on the priority of the access types or an actual requirement, the access type used to access the server, and send, to the another network device, the access type used to access the server. In this way, the another network device may directly use the access type that is determined by the terminal device and that is used to access the server.

Figure 6:
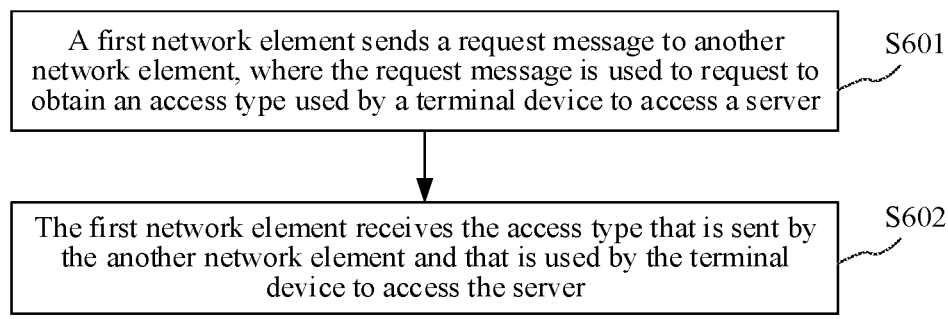
FIG. 6 is a schematic diagram of a method for obtaining an access type by a first network element according to the third embodiment of the present disclosure.

FIG. 6 is a schematic diagram of a method for obtaining an access type by a first network element according to the third embodiment of the present disclosure. Referring to FIG. 6, the method may include the following operations.

S601: A first network element sends a request message to another network element, where the request message is used to request to obtain an access type used by a terminal device to access a server.

In one embodiment, the first network element may be an access and mobility management network element, and the another network element includes at least one of a policy control function network element, a network exposure function network element, a server, and a database. In one embodiment, an access type that is stored in the another network element and that is used by the terminal device to access the server is sent by the terminal device. In one embodiment, an access type that is stored in the network exposure function network element, the server, and the database and that is used by the terminal device to access the server is sent by the policy control function network element.

In one embodiment, the first network element may be the access and mobility management network element, and the another network element is the terminal device. Correspondingly, the access type used by the terminal device to access the server is determined by the terminal device.

In one embodiment, the first network element includes the access and mobility management network element, the policy control function network element, the network exposure function network element, or the terminal device.

It should be noted that, in an actual application process, the first network element and the another network element may be other devices. This is not specifically limited in the embodiments of the present disclosure.

S602: The first network element receives the access type that is sent by the another network element and that is used by the terminal device to access the server.

In one embodiment, the first network element receives priority information of the access type sent by the another network element.

It should be noted that S601 is an optional operation. Alternatively, the another network element may actively send, to the first network element in a preset trigger condition, the access type used by the terminal device to access the server.

In the embodiment shown in FIG. 6, when the first network element needs to obtain the access type used by the terminal device to access the server, the first network element may directly obtain the access type from the another network element, so that the first network element can quickly obtain the access type used by the terminal device to access the server.

Figure 7:
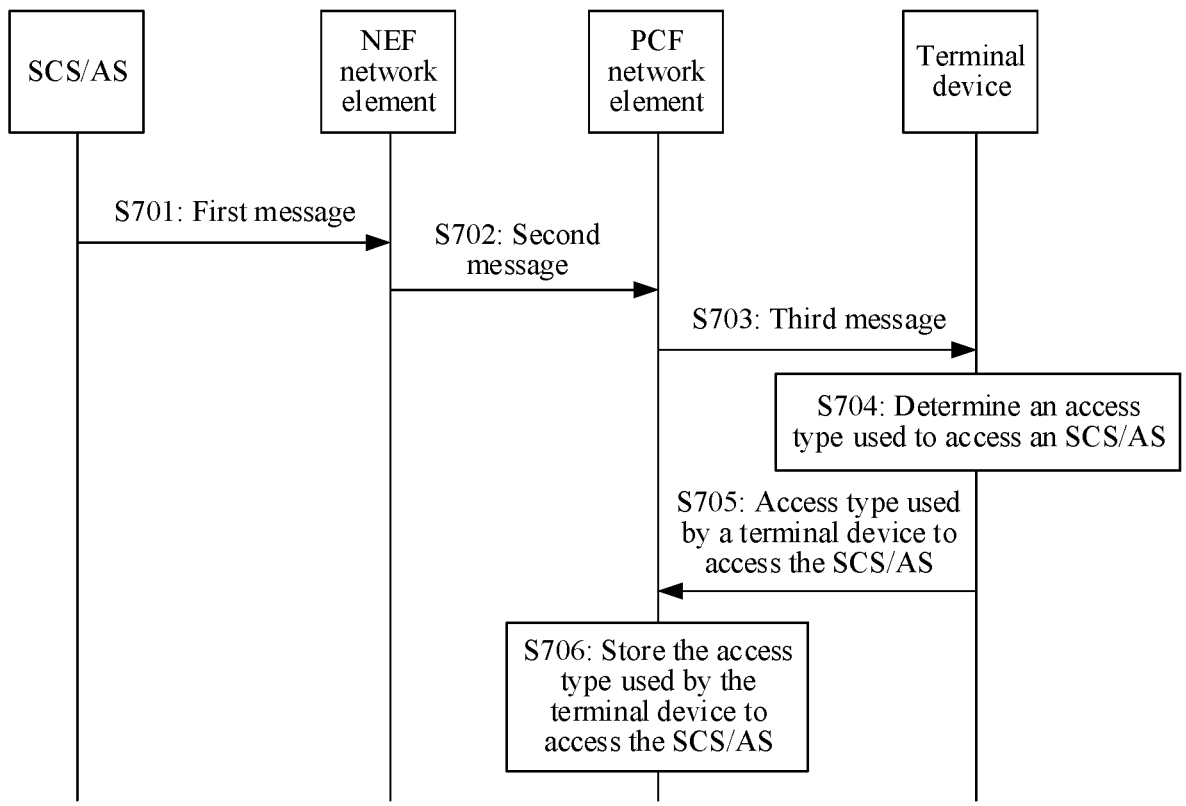
FIG. 7 is a second schematic diagram of a method for determining an access type according to the third embodiment of the present disclosure.

FIG. 7 is a second schematic diagram of a method for determining an access type according to the third embodiment of the present disclosure. Referring to FIG. 7, the method may include the following operations.

Operation S701: An SCS/AS sends a first message to an NEF network element, where the first message is used to instruct to determine an access type used by a terminal device to access the SCS/AS.

In one embodiment, the first message may include at least one of identification information of the SCS/AS, access types corresponding to the SCS/AS, identification information of the terminal device, and a priority of the access types corresponding to the SCS/AS.

The NEF may store access technology types corresponding to the SCS/AS.

Alternatively, the subsequent operation S702 is performed.

Operation S702: The NEF network element sends a second message to a PCF network element, where the second message is used to instruct to determine the access type used by the terminal device to access the SCS/AS.

In one embodiment, the second message may include at least one of identification information of the SCS/AS, access types corresponding to the SCS/AS, identification information of the terminal device, and a priority of the access types corresponding to the SCS/AS.

After the operation is performed, the PCF may store the SCS/AS and the access technology types corresponding to the SCS/AS.

Alternatively, the subsequent operation S703 is performed.

Operation S703: The PCF network element sends a third message to the terminal device, where the third message is used to instruct to determine the access type used by the terminal device to access the SCS/AS.

In one embodiment, the third message may include at least one of identification information of the SCS/AS, access types corresponding to the SCS/AS, identification information of the terminal device, and a priority of the access types corresponding to the SCS/AS.

In one embodiment, the PCF network element may send the third message to the terminal device when the terminal device is registered with a network, or the PCF network element may send the third message to the terminal device in another signaling process.

Operation S704: The terminal device determines, among access types corresponding to the SCS/AS, the access type used to access the SCS/AS.

In one embodiment, when the third message includes the priority of the access types corresponding to the SCS/AS, the terminal device may determine, based on the priority of the access types corresponding to the SCS/AS, the access type used to access the SCS/AS.

In one embodiment, when a notification message does not include the priority of the access types corresponding to the SCS/AS, the terminal device may alternatively determine, based on an access requirement, the access type used to access the SCS/AS.

Operation S705: The terminal device sends, to the PCF network element, the access type used by the terminal device to access the SCS/AS.

It should be noted that in S703 and S705, interaction between the terminal device and the PCF network element usually needs to be performed through the AMF network element. For the process in which the AMF network element obtains, from the terminal device, the access type used by the terminal device to access the SCS/AS, refer to S201, and details are not described herein again.

Operation S706: The PCF network element stores the access type used by the terminal device to access the SCS/AS.

Certainly, in an actual application process, the terminal device may alternatively send, to the another network device, the access type used by the terminal device to access the SCS/AS, so that the another network device stores the access type used by the terminal device to access the SCS/AS. For example, the another network device may be the AMF network element or the database. In an actual application process, the network device may be determined based on an actual requirement.

In one embodiment, after S706, the PCF network element may alternatively send the access type used by the terminal device to access the SCS/AS to other network devices, for example, the NEF network element, the AMF network element, and the database. Specifically, the PCF network element may alternatively send, to the network devices based on requests of the network devices, the access technology type used by the terminal device to access the SCS/AS.

In the embodiment shown in FIG. 7, the terminal device pre-determines the access type used to access the SCS/AS, and stores the access type used to access the SCS/AS in the network device. In this way, when the first network element needs to obtain the access type used by the terminal device to access the SCS/AS, the access type may be obtained directly from the corresponding network device.

In an actual application process, the access and mobility management network element may alternatively determine the status of the terminal device based on a location of the terminal device or a protocol data unit session state of the terminal device in a local data network. In the following description, a method for determining the status of the terminal device is described in detail by using embodiments shown in FIG. 8 and FIG. 9.

Figure 8:
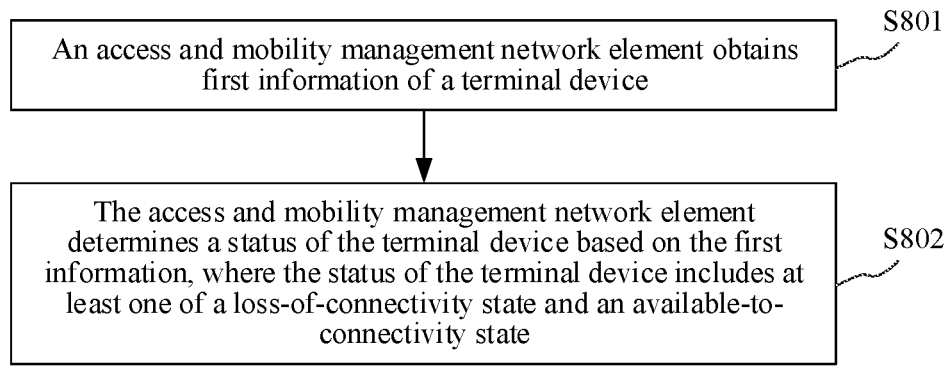
FIG. 8 is a first schematic diagram of a method for determining a status of a terminal device according to a fourth embodiment of the present disclosure.

FIG. 8 is a first schematic diagram of a method for determining a status of a terminal device according to a fourth embodiment of the present disclosure. Referring to FIG. 8, the method may include the following operations.

Operation S801: An access and mobility management network element obtains first information of a terminal device.

The first information includes at least one of location information of the terminal device and a protocol data unit (PDU) session state of the terminal device in a local area data network (LADN).

The LADN is a data network that can only provide a service to a terminal device in a service area. That is, the LADN has a corresponding service area. Only a terminal device located within the service area of the LAND can establish a data connection to access the LADN, and when the terminal device leaves the service area, the established data connection is unavailable.

For example, only the terminal device located within the service area of the LAND can establish a PDU session connection of the LADN, and when the terminal device leaves the service area, the PDU session established between the terminal device and the LADN cannot be used to transmit a data packet.

In one embodiment, when the terminal device is in a connected state, the access and mobility management network element may obtain the location information of the terminal device, or when the terminal device is in an idle state, the access and mobility management network element may page the terminal device, and obtain the location information of the terminal device after the terminal device is paged.

In one embodiment, the access and mobility management network element may obtain, from a device such as an NEF network element, a PCF network element, or an SMF network element, the PDU session state of the terminal device in the LADN.

Operation S802: The access and mobility management network element determines a status of the terminal device based on the first information, where the status of the terminal device includes at least one of a loss-of-connectivity state and an available-to-connectivity state.

It should be noted that the status of the terminal device shown in the embodiment of FIG. 7 is a state determined by using a server as a granularity.

When the first information includes different content, methods for obtaining a connection status of the terminal device are different, for example, may include at least the following two feasible implementations.

In a feasible implementation, the first information includes the location information of the terminal device.

The access and mobility management network element obtains a server accessed by the terminal device. If a data network corresponding to the server is the LADN, the access and mobility management network element determines the status of the terminal device based on the location information of the terminal device and the service area of the LADN.

In one embodiment, the access and mobility management network element may obtain the service area of the LADN. If the terminal device is located within the service area of the LADN, the access and mobility management network element determines that the connection status of the terminal device is the available-to-connectivity state, that is, a connection status of the terminal device corresponding to the server is the available-to-connectivity state. If the terminal device is located outside the service area of the LADN, the access and mobility management network element determines that the connection status of the terminal device is the loss-of-connectivity state, that is, a connection status of the terminal device corresponding to the server is the loss-of-connectivity state.

It should be noted that when the data network corresponding to the server is not the LADN, the status of the terminal device may be determined based on the method shown in the embodiments of FIG. 2 to FIG. 7.

In another feasible implementation, the first information includes the PDU session state of the LADN.

The PDU session status information in the first information may be obtained by an access and mobility management network element function device from a session management function (SMF) device.

The access and mobility management network element determines that the connection status of the terminal device is the available-to-connectivity state if the PDU session state of the terminal device in the LADN is an available state, where the available state means that a user plane connection of the PDU session is in an active state, that is, there is a data transmission channel that can be used to transmit data; or the access and mobility management network element determines that the status of the terminal device is the loss-of-connectivity state if the PDU session state of the terminal device in the LADN is an unavailable state, where the unavailable state means that a user plane connection of the PDU session is in a deactivate state, that is, data transmission cannot be performed.

In an actual application process, when the terminal device is located within the service area of the LAND, the PDU session established between the terminal device and the LADN can be used to transmit the data packet. In this case, the PDU session state of the terminal device in the LADN is the available state. When the terminal device is located outside the service area of the LADN, the PDU session established between the terminal device and the LADN cannot be used to transmit the data packet. In this case, the PDU session state of the terminal device in the LADN is the unavailable state.

Based on the embodiment shown FIG. 8, in the following description, the method for determining the status of the terminal device based on the location of the terminal device is further described by using an embodiment shown in FIG. 9.

Figure 9:
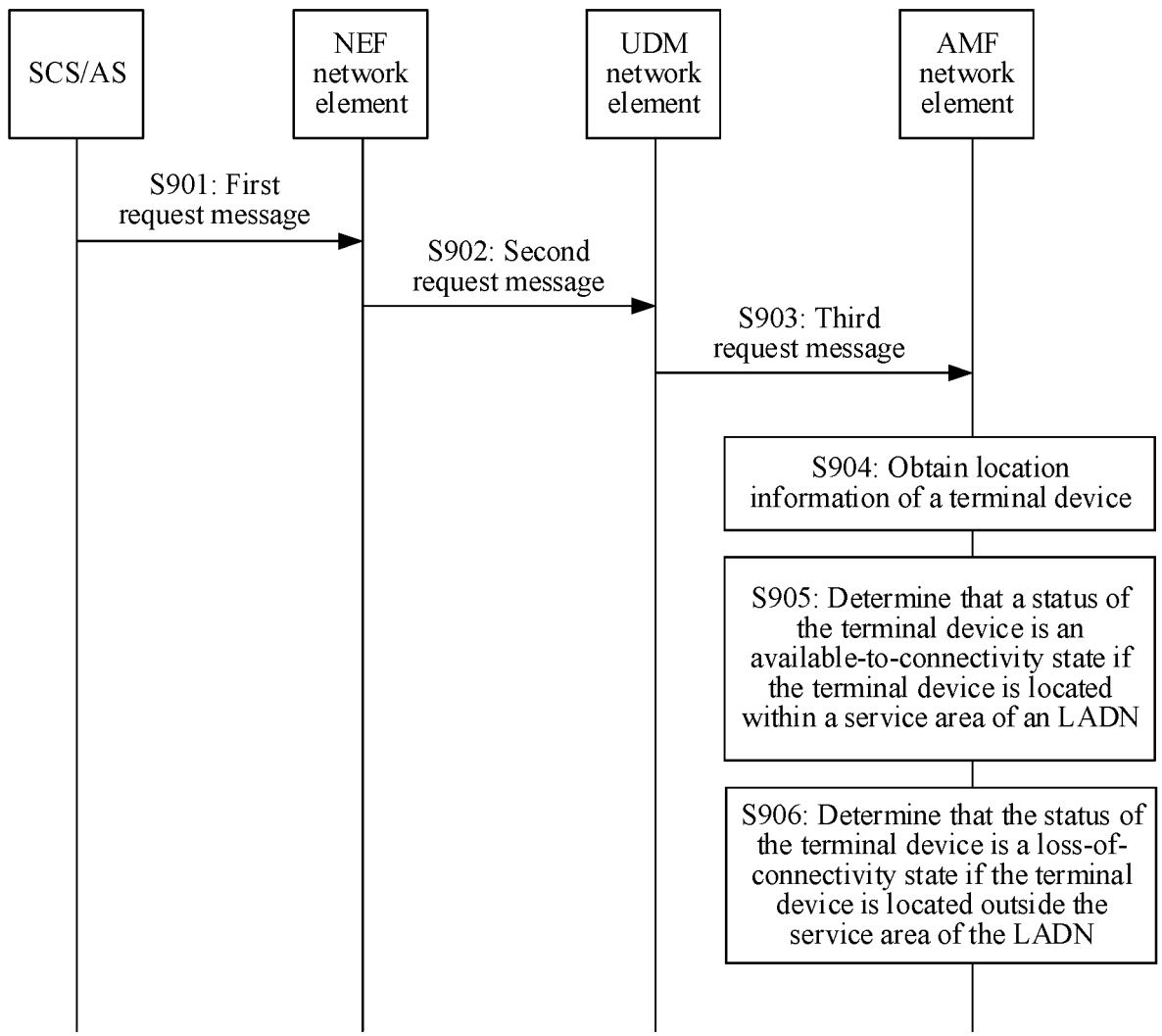
FIG. 9 is a second schematic diagram of a method for determining a status of a terminal device according to the fourth embodiment of the present disclosure.

FIG. 9 is a second schematic diagram of a method for determining a status of a terminal device according to the fourth embodiment of the present disclosure. In the embodiment shown in FIG. 9, description is provided by using an example in which an access and mobility management network element is an AMF network element, a data management network element is a UDM network element, and a server is an SCS/AS. Referring to FIG. 9, the method may include the following operations.

Operation S901: An SCS/AS sends a first request message to an NEF network element, where the first request message is used to request a status of a terminal device corresponding to the SCS/AS.

In one embodiment, the first request message includes at least one of identification information of the terminal device, identification information of the SCS/AS, and information about an LADN corresponding to the SCS/AS. Certainly, the first request information may further include another content. This is not specifically limited in the present disclosure.

In one embodiment, the SCS/AS may first obtain DN information, and determine the information about the LADN based on the DN information.

In one embodiment, the information about the LADN may include a service area of the LADN, a PDU session state of the terminal device in the LADN, or the like.

Operation S902: The NEF network element sends a second request message to a UDM network element, where the second request message is used to request the status of the terminal device corresponding to the SCS/AS.

In one embodiment, the second request message includes at least one of identification information of the terminal device, identification information of the SCS/AS, and information about an LADN corresponding to the SCS/AS. Certainly, the first request information may further include another content. This is not specifically limited in the present disclosure.

In one embodiment, if the first request message includes the information about the LADN corresponding to the SCS/AS, the NEF network element may carry, in the second request message, the information about the LADN included in the first request message. Alternatively, the NEF network element may obtain the information about the LADN corresponding to the SCS/AS, and carry, in the second request message, the information about the LADN corresponding to the SCS/AS. For example, the NEF network element may obtain the information about the LADN from another network device (for example, a PCF network element or a database).

In one embodiment, the NEF network element may alternatively determine whether the first request message is legal. When the first request message is illegal, the NEF network element sends a rejection message to the SCS/AS, and carries a rejection cause in the rejection message. For example, the NEF network element may determine, based on a format of the first request message and the content in the first request message, whether the first request message is legal.

Operation S903: The UDM network element sends a third request message to an AMF network element, where the third request message is used to request the status of the terminal device corresponding to the SCS/AS.

In one embodiment, the third request message includes at least one of identification information of the terminal device, identification information of the SCS/AS, and information about an LADN corresponding to the SCS/AS. Certainly, the first request information may further include another content. This is not specifically limited in the present disclosure.

In one embodiment, if the second request message includes the information about the LADN corresponding to the SCS/AS, the UDM network element may directly carry, in the third request message, the information about the LADN included in the second request message; or if the second request message does not include the information about the LADN corresponding to the SCS/AS, the UDM network element may obtain the information about the LADN corresponding to the SCS/AS, and carry, in the third request message, the information about the LADN corresponding to the SCS/AS. For example, the NEF network element may obtain the information about the LADN from the another network device (for example, the PCF network element or the database).

Operation S904: The AMF network element obtains location information of the terminal device.

It should be noted that for a process of performing S904, refer to S801, and details are not described herein again.

Operation S905: The AMF network element determines that the status of the terminal device is an available-to-connectivity state if the terminal device is located within a service area of an LADN.

Operation S906: The AMF network element determines that the status of the terminal device is a loss-of-connectivity state if the terminal device is located outside the service area of the LADN.

In the embodiments shown in FIG. 8 and FIG. 9, the access and mobility management network element may accurately determine the status of the terminal device based on the location of the terminal device or the PDU session state of the terminal device in the LADN.

Figure 10:
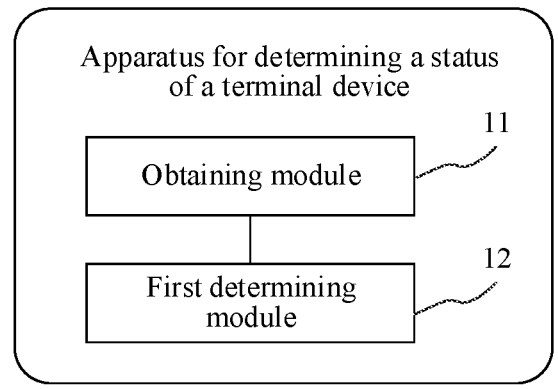
FIG. 10 is a first schematic structural diagram of an apparatus for determining a status of a terminal device according to a fifth embodiment of the present disclosure.

FIG. 10 is a first schematic structural diagram of an apparatus for determining a status of a terminal device according to a fifth embodiment of the present disclosure. Referring to FIG. 10, the apparatus may include an obtaining module 11 and a first determining module 12.

The obtaining module 11 is configured to obtain an access type used by the terminal device to access a network, where the access type includes at least one of 3rd generation partnership project (3GPP) access and non-3GPP access.

The first determining module 12 is configured to determine, based on a status of the terminal device in the access type, the status of the terminal device, where the status of the terminal device includes at least one of a loss-of-connectivity state and an available-to-connectivity state.

The apparatus for determining the status of the terminal device provided in this embodiment of the present disclosure can perform the technical solutions described in the foregoing method embodiments of FIG. 2 to FIG. 4. Implementation principles and beneficial effects thereof are similar, and details are not described herein again.

In one embodiment, the obtaining module 11 is specifically configured to:

determine a server accessed by the terminal device; and obtain an access type used by the terminal device to access the server.

In another embodiment, the obtaining module 11 is specifically configured to:

receive an access type that is sent by the terminal device and that is used by the terminal device to access the server.

In another embodiment, the first determining module 12 is specifically configured to:

determine, based on the status of the terminal device in the access type, a status of the terminal device corresponding to the server.

In another embodiment, the obtaining module 11 is specifically configured to:

receive the access type that is sent by a network device and that is used by the terminal device to access the network, where the network device includes at least one of a server, a network exposure function network element, a policy control function network element, and a database.

Figure 11:
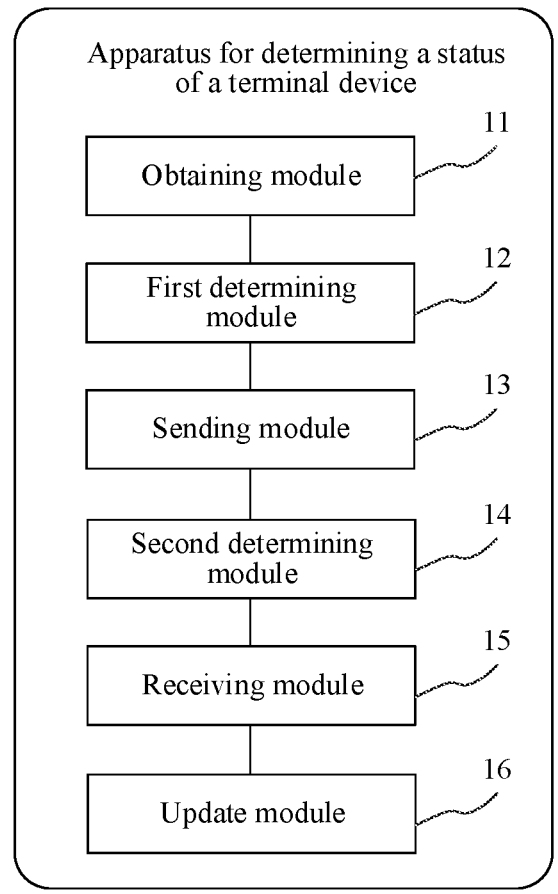
FIG. 11 is a second schematic structural diagram of an apparatus for determining a status of a terminal device according to the fifth embodiment of the present disclosure.

FIG. 11 is a second schematic structural diagram of an apparatus for determining a status of a terminal device according to the fifth embodiment of the present disclosure. Based on the embodiment shown in FIG. 10, referring to FIG. 11, the apparatus further includes a sending module 13.

The sending module 13 is configured to send identification information of the terminal device to the network device before the obtaining module 11 receives the access type that is sent by the network device and that is used by the terminal device to access the network.

In another embodiment, the first determining module 12 is specifically configured to:

determine that the status of the terminal device in the access type is the status of the terminal device if the access type used by the terminal device to access the network is the 3GPP access or the non-3GPP access;

when the terminal device in the 3GPP access and/or the non-3GPP access is in the available-to-connectivity state, determine that the status of the terminal device is the available-to-connectivity state if the access type used by the terminal device to access the network is the 3GPP access and the non-3GPP access; or when the terminal device in both the 3GPP access and the non-3GPP access is in the loss-of-connectivity state, determine that the status of the terminal device is the loss-of-connectivity state if the access type used by the terminal device to access the network is the 3GPP access and the non-3GPP access.

In another embodiment, the apparatus further includes a second determining module 14.

The second determining module 14 is configured to determine the status of the terminal device in the access type before the first determining module 12 determines, based on the status of the terminal device in the access type, the status of the terminal device.

In another embodiment, the access type used by the terminal device to access the network is the 3GPP access, and the second determining module 14 is specifically configured to:

determine that a status of the terminal device in the 3GPP access is the loss-of-connectivity state if the terminal device is in a mobile initiated connection only (MICO) mode and an idle state or if the terminal device is located in a restricted service area.

In another embodiment, the access type used by the terminal device to access the network is the non-3GPP access, and the second determining module 14 is specifically configured to:

determine that a status of the terminal device in the non-3GPP access is the loss-of-connectivity state if the terminal device is in an idle state; or determine that a status of the terminal device in the non-3GPP access is the available-to-connectivity state if the terminal device is in a connected state.

In another embodiment, the sending module 13 is further configured to send a first message to the server when determining that the access type used by the terminal device to access the network is the non-3GPP access, and determining that the status of the terminal device corresponding to the server is the available-to-connectivity state, where the first message is used to instruct the server to reject setting of maximum detection time.

In another embodiment, the access type used by the terminal device to access the network includes the 3GPP access and the non-3GPP access, and the type used by the terminal device to access the server is the 3GPP access. The first determining module 12 is specifically configured to:

determine that a status of the terminal device in the 3GPP access is the loss-of-connectivity state if the terminal device is in a mobile initiated connection only (MICO) mode and an idle state or if the terminal device is located in a restricted service area.

In another embodiment, the access type used by the terminal device to access the network is the 3GPP access and the non-3GPP access, and the access type used by the terminal device to access the server is the non-3GPP access. The first determining module 12 is specifically configured to:

determine that the status of the terminal device corresponding to the server is the available-to-connectivity state when the terminal device is in a connected state;

determine that the status of the terminal device corresponding to the server is the loss-of-connectivity state when the terminal device is in an idle state;

determine that the status of the terminal device corresponding to the server is the available-to-connectivity state when the terminal device is in an idle state and the terminal device can access the server by using a 3GPP technology; or determine that the status of the terminal device corresponding to the server is the loss-of-connectivity state when the terminal device is in an idle state and the terminal device cannot access the server by using a 3GPP technology.

In another embodiment, the apparatus further includes a receiving module 15 and an update module 16.

The receiving module 15 is configured to receive maximum detection time sent by a server corresponding to the server when the access type used by the terminal device to access the network is the 3GPP access and the non-3GPP access, the access type used by the terminal device to access the server is the non-3GPP access, the terminal device is in an idle state, and the terminal device can access the server by using the 3GPP.

The update module 16 is configured to update a timer based on the maximum detection time.

In another embodiment, the receiving module 15 is further configured to:

receive, before the obtaining module obtains the access type used by the terminal device to access the network, identification information of the server that is sent by the server, the network exposure function network element, or the policy control function network element.

In another embodiment, the sending module 13 is further configured to send, to the server after the first determining module determines, based on the status of the terminal device in the access type, the status of the terminal device, the status of the terminal device or the status of the terminal device and the access type used by the terminal device to access the server.

The apparatus for determining the status of the terminal device provided in this embodiment of the present disclosure can perform the technical solutions described in the foregoing method embodiments of FIG. 2 to FIG. 4. Implementation principles and beneficial effects thereof are similar, and details are not described herein again.

Figure 12:
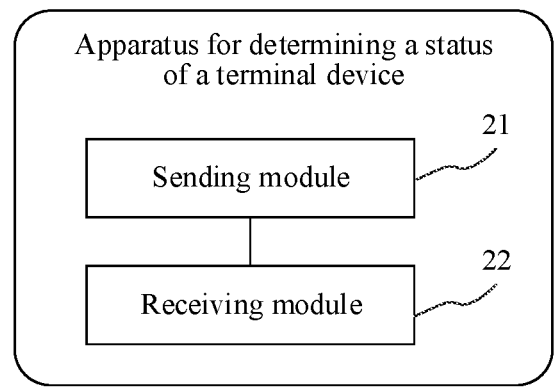
FIG. 12 is a schematic structural diagram of an apparatus for determining a status of a terminal device according to a sixth embodiment of the present disclosure.

FIG. 12 is a schematic structural diagram of an apparatus for determining a status of a terminal device according to a sixth embodiment of the present disclosure. Referring to FIG. 12, the apparatus includes a sending module 21 and a receiving module 22.

The sending module 21 is configured to send a request message to an access and mobility management network element, where the request message is used to request a status of a terminal device corresponding to a server.

The receiving module 22 is configured to receive a response message sent by the access and mobility management network element, where the response message includes the status of the terminal device corresponding to the server.

In one embodiment, the request message includes identification information of the terminal device and identification information of the server.

The apparatus for determining the status of the terminal device provided in this embodiment of the present disclosure can perform the technical solutions described in the foregoing method embodiments of FIG. 2 to FIG. 4. Implementation principles and beneficial effects thereof are similar, and details are not described herein again.

Figure 13:
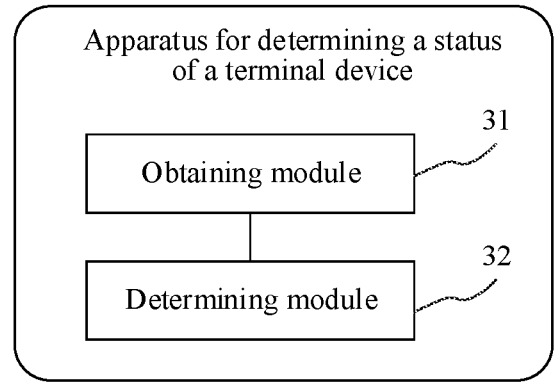
FIG. 13 is a schematic structural diagram of an apparatus for determining a status of a terminal device according to a seventh embodiment of the present disclosure.

FIG. 13 is a schematic structural diagram of an apparatus for determining a status of a terminal device according to a seventh embodiment of the present disclosure. Referring to FIG. 13, the apparatus includes an obtaining module 31 and a determining module 32.

The obtaining module 31 is configured to obtain first information of the terminal device, where the first information includes at least one of location information of the terminal device and a protocol data unit (PDU) session state of the terminal device in a local area data network (LADN).

The determining module 32 is configured to determine the status of the terminal device based on the first information, where the status includes at least one of a loss-of-connectivity state and an available-to-connectivity state.

In one embodiment, the determining module 32 is specifically configured to:
determine a server accessed by the terminal device; and
determine the status of the terminal device based on the location information of the terminal device and a service area of the LADN if a data network corresponding to the server is the LADN.

In another embodiment, the determining module 32 is specifically configured to:
obtain the service area of the LADN; and
determine that the status of the terminal device is the available-to-connectivity state if the terminal device is located within the service area of the LADN; or
determine that the status of the terminal device is the loss-of-connectivity state if the terminal device is located outside the service area of the LADN.

In another embodiment, the determining module 32 is specifically configured to:

determine that the status of the terminal device is the available-to-connectivity state if the PDU session state of the terminal device in the local data network is an available state; or
determine that the status of the terminal device is the loss-of-connectivity state if the PDU session state of the terminal device in the local data network is an unavailable state.

The apparatus for determining the status of the terminal device provided in this embodiment of the present disclosure can perform the technical solutions described in the foregoing method embodiments of FIG. 8 and FIG. 9. Implementation principles and beneficial effects thereof are similar, and details are not described herein again.

Figure 14:
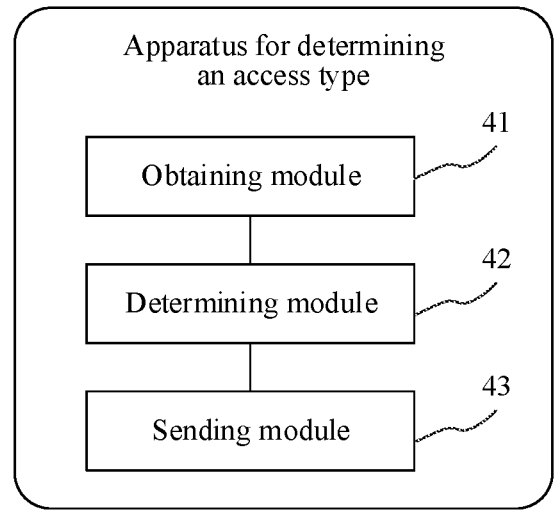
FIG. 14 is a schematic structural diagram of an apparatus for determining an access type according to an eighth embodiment of the present disclosure.

FIG. 14 is a schematic structural diagram of an apparatus for determining an access type according to an eighth embodiment of the present disclosure. Referring to FIG. 14, the apparatus includes an obtaining module 41, a determining module 42, and a sending module 43.

The obtaining module 41 is configured to obtain access types supported by a server.

The determining module 42 is configured to determine an access type used to access the server among the access types supported by the server.

The sending module 43 is configured to send, to a network device, the access type used by the terminal device to access the server.

The apparatus for determining the status of the terminal device provided in this embodiment of the present disclosure can perform the technical solutions described in the foregoing method embodiments of FIG. 5 and FIG. 7. Implementation principles and beneficial effects thereof are similar, and details are not described herein again.

In one embodiment, the determining module 42 is specifically configured to:
obtain a priority of the access types supported by the server; and
determine, based on the priority, the access type used by the terminal device to access the server.

In another embodiment, the obtaining module 41 is specifically configured to:
receive the priority sent by a policy control function network element.

In another embodiment, the network device includes any one of a server, an access and mobility management network element, a policy control function network element, a network exposure function network element, and a database.

In another embodiment, the obtaining module 41 is specifically configured to:
receive the access types that are used by the terminal device and that are supported by the server, where the access types are sent by the network device.

In another embodiment, the obtaining module 41 is specifically configured to:
determine the access types that are used by the terminal device and that are supported by the server.

The apparatus for determining the status of the terminal device provided in this embodiment of the present disclosure can perform the technical solutions described in the foregoing method embodiments of FIG. 5 and FIG. 7. Implementation principles and beneficial effects thereof are similar, and details are not described herein again.

Figure 15:
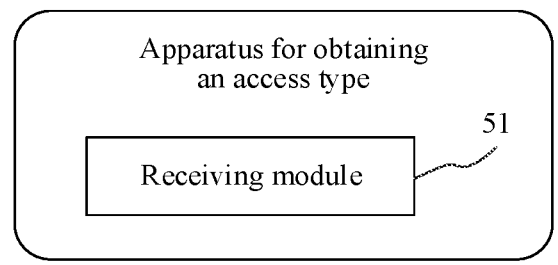
FIG. 15 is a first schematic structural diagram of an apparatus for obtaining an access type according to a ninth embodiment of the present disclosure.

FIG. 15 is a first schematic structural diagram of an apparatus for obtaining an access type according to a ninth embodiment of the present disclosure. Referring to FIG. 15, the apparatus includes a receiving module 51.

The receiving module 51 is configured to receive an access type that is sent by another network element and that is used by a terminal device to access a server.

The apparatus for determining the status of the terminal device provided in this embodiment of the present disclosure can perform the technical solutions described in the foregoing method embodiments of FIG. 6 and FIG. 7. Implementation principles and beneficial effects thereof are similar, and details are not described herein again.

Figure 16:
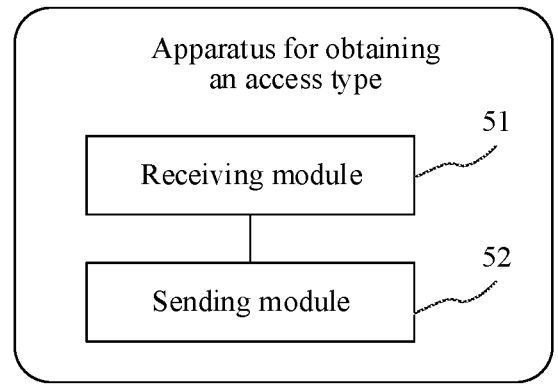
FIG. 16 is a second schematic structural diagram of an apparatus for obtaining an access type according to the ninth embodiment of the present disclosure.

FIG. 16 is a second schematic structural diagram of an apparatus for obtaining an access type according to the ninth embodiment of the present disclosure. Based on the embodiment shown in FIG. 15, referring to FIG. 16, the apparatus further includes a sending module 52.

The sending module 52 is configured to send a request message to the another network element before the receiving module 51 receives the access type that is sent by the another network element and that is used by the terminal device to access the server, where the request message is used to request to obtain the access type used by the terminal device to access the server.

In another embodiment, the receiving module 51 is further configured to receive priority information of the access type sent by the another network element.

In another embodiment, the first network element is an access and mobility management network element, and the another network element includes at least one of a control function network element, a network exposure function network element, a server, a database, and a terminal device.

In another embodiment, the first network element is an access and mobility management network element, the another network element is a terminal device, and the access type used by the terminal device to access the server is an access type that is determined by the terminal device and that is used to access the server.

In another embodiment, the first network element includes an access and mobility management network element, a policy control function network element, a network exposure function network element, or a terminal device.

The apparatus for determining the status of the terminal device provided in this embodiment of the present disclosure can perform the technical solutions described in the foregoing method embodiments of FIG. 6 and FIG. 7. Implementation principles and beneficial effects thereof are similar, and details are not described herein again.

Figure 17:
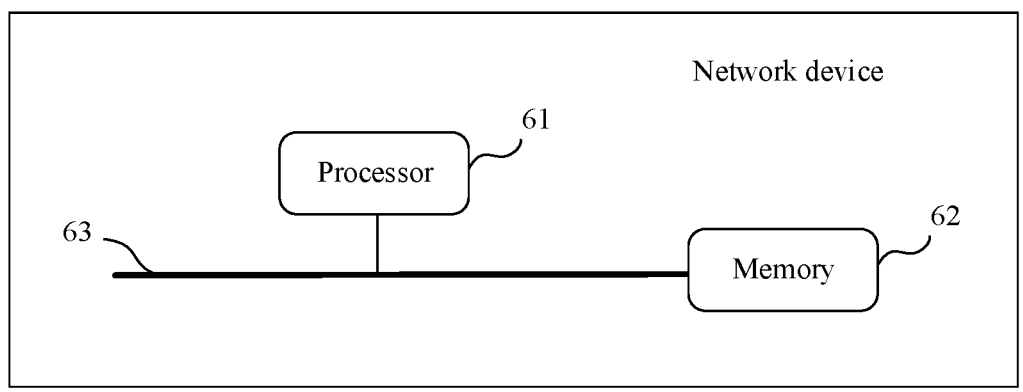
FIG. 17 is a first schematic structural diagram of a network device according to a tenth embodiment of the present disclosure.

FIG. 17 is a first schematic structural diagram of a network device according to a tenth embodiment of the present disclosure. Referring to FIG. 17, the network device includes a processor 61, a memory 62, and a communications bus 63. The communications bus 63 is configured to implement a connection between components. The memory 62 is configured to store a program instruction. The processor 61 is configured to: read the program instruction in the memory 62 and perform, based on a program in the memory 62, the following operations:

obtaining an access type used by the terminal device to access a network, where the access type includes at least one of 3rd generation partnership project (3GPP) access and non-3GPP access; and determining, based on a status of the terminal device in the access type, a status of the terminal device, where the status of the terminal device includes at least one of a loss-of-connectivity state and an available-to-connectivity state.

The network device provided in this embodiment of the present disclosure can perform the technical solutions described in the foregoing method embodiments of FIG. 2 to FIG. 4. Implementation principles and beneficial effects thereof are similar, and details are not described herein again.

In one embodiment, the processor 61 is specifically configured to:

determine a server accessed by the terminal device; and obtain an access type used by the terminal device to access the server.

In another embodiment, the processor 61 is specifically configured to:

determine, based on the status of the terminal device in the access type, a status of the terminal device corresponding to the server.

Figure 18:
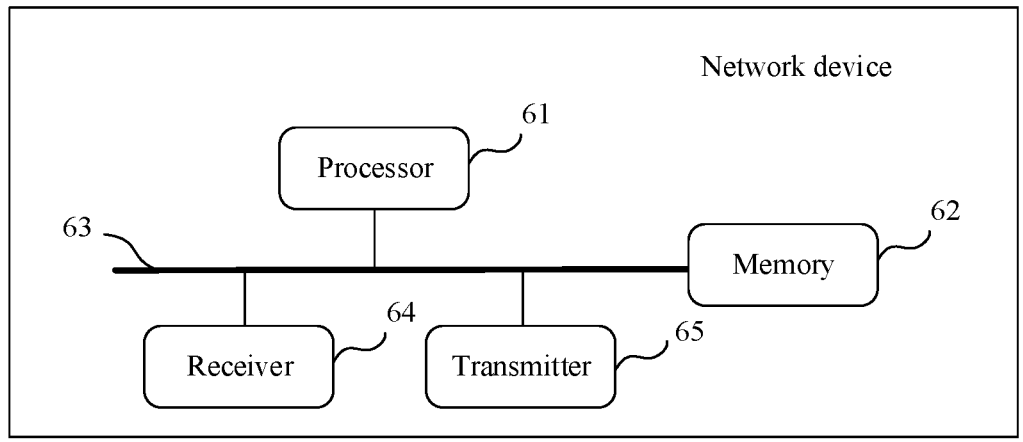
FIG. 18 is a second schematic structural diagram of a network device according to the tenth embodiment of the present disclosure.

FIG. 18 is a second schematic structural diagram of a network device according to the tenth embodiment of the present disclosure. Based on the embodiment shown in FIG. 17, referring to FIG. 18, the network device further includes a receiver 64.

The receiver 64 is configured to receive an access type that is sent by the network device and that is used by the terminal device to access the network, where the network device includes at least one of a server, a network exposure function network element, a policy control function network element, and a database.

In another embodiment, the apparatus further includes a transmitter 65.

The transmitter 65 is configured to send identification information of the terminal device to the network device before the receiver 64 receives the access type that is sent by the network device and that is used by the terminal device to access the network.

In another embodiment, the processor 61 is specifically configured to:

determine that the status of the terminal device in the access type is the status of the terminal device if the access type used by the terminal device to access the network is the 3GPP access or the non-3GPP access;

when the terminal device in the 3GPP access and/or the non-3GPP access is in the available-to-connectivity state, determine that the status of the terminal device is the available-to-connectivity state if the access type used by the terminal device to access the network is the 3GPP access and the non-3GPP access; or when the terminal device in both the 3GPP access and the non-3GPP access is in the loss-of-connectivity state, determine that the status of the terminal device is the loss-of-connectivity state if the access type used by the terminal device to access the network is the 3GPP access and the non-3GPP access.

In another embodiment, the processor 61 is further configured to determine the status of the terminal device in the access type before the processor 61 determines, based on the status of the terminal device in the access type, the status of the terminal device.

In another embodiment, the access type used by the terminal device to access the network is the 3GPP access, and the processor 61 is specifically configured to:

determine that a status of the terminal device in the 3GPP access is the loss-of-connectivity state if the terminal device is in a mobile initiated connection only (MICO) mode and an idle state or if the terminal device is located in a restricted service area.

In another embodiment, the access type used by the terminal device to access the network is the non-3GPP access, and the processor 61 is specifically configured to:

determine that a status of the terminal device in the non-3GPP access is the loss-of-connectivity state if the terminal device is in an idle state; or determine that a status of the terminal device in the non-3GPP access is the available-to-connectivity state if the terminal device is in a connected state.

In another embodiment, the transmitter 65 is further configured to send a first message to the server when determining that the access type used by the terminal device to access the network is the non-3GPP access, and determining that the status of the terminal device corresponding to the server is the available-to-connectivity state, where the first message is used to instruct the server to reject setting of maximum detection time.

In another embodiment, the access type used by the terminal device to access the network includes the 3GPP access and the non-3GPP access, and the type used by the terminal device to access the server is the 3GPP access. The processor 61 is specifically configured to:

determine that a status of the terminal device in the 3GPP access is the loss-of-connectivity state if the terminal device is in a mobile initiated connection only (MICO) mode and an idle state or if the terminal device is located in a restricted service area.

In another embodiment, the access type used by the terminal device to access the network is the 3GPP access and the non-3GPP access, and the access type used by the terminal device to access the server is the non-3GPP access. The processor 61 is specifically configured to:

determine that the status of the terminal device corresponding to the server is the available-to-connectivity state when the terminal device is in a connected state;

determine that the status of the terminal device corresponding to the server is the loss-of-connectivity state when the terminal device is in an idle state;

determine that the status of the terminal device corresponding to the server is the available-to-connectivity state when the terminal device is in an idle state and the terminal device can access the server by using a 3GPP technology; or determine that the status of the terminal device corresponding to the server is the loss-of-connectivity state when the terminal device is in an idle state and the terminal device cannot access the server by using a 3GPP technology.

In another embodiment, the receiver 64 is further configured to receive maximum detection time sent by a server corresponding to the server when the access type used by the terminal device to access the network is the 3GPP access and the non-3GPP access, the access type used by the terminal device to access the server is the non-3GPP access, the terminal device is in an idle state, and the terminal device can access the server by using the 3GPP.

The processor 61 is further configured to update a timer based on the maximum detection time.

In another embodiment, the receiver 64 is further configured to:

receive, before the processor 61 obtains the access type used by the terminal device to access the network, identification information of the server that is sent by the server, the network exposure function network element, or the policy control function network element.

In another embodiment, the transmitter 65 is configured to send, to the server after the processor 61 determines, based on the status of the terminal device in the access type, the status of the terminal device, the status of the terminal device or the status of the terminal device and the access type used by the terminal device to access the server.

The network device provided in this embodiment of the present disclosure can perform the technical solutions described in the foregoing method embodiments of FIG. 2 to FIG. 4. Implementation principles and beneficial effects thereof are similar, and details are not described herein again.

Figure 19:
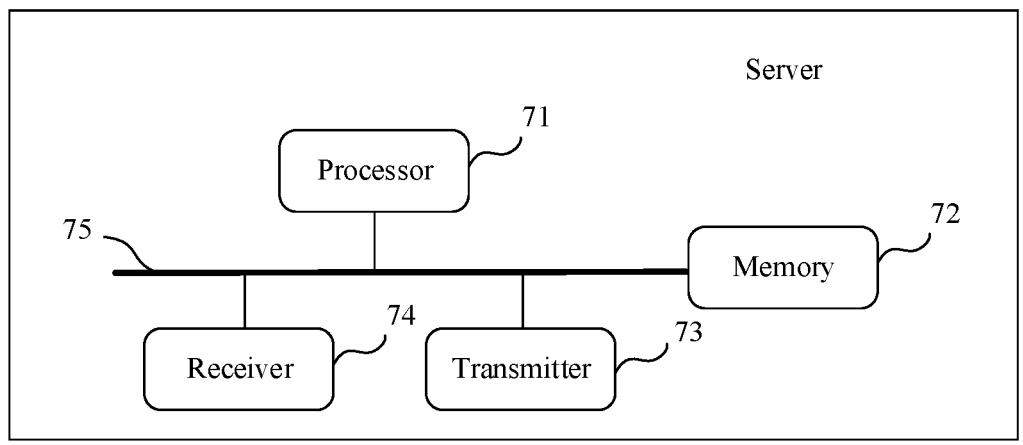
FIG. 19 is a schematic structural diagram of a server according to an eleventh embodiment of the present disclosure.

FIG. 19 is a schematic structural diagram of a server according to an eleventh embodiment of the present disclosure. Referring to FIG. 19, the server includes a processor 71, a memory 72, a transmitter 73, a receiver 74, and a communications bus 75. The communications bus 75 is configured to implement a connection between components. The memory 72 is configured to store a program instruction. The processor 71 is configured to read and execute the program instruction in the memory 72.

The transmitter 73 is configured to send a request message to an access and mobility management network element, where the request message is used to request a status of the terminal device corresponding to the server.

The receiver 74 is configured to receive a response message sent by the access and mobility management network element, where the response message includes the status of the terminal device corresponding to the server.

In one embodiment, the request message includes identification information of the terminal device and identification information of the server.

The server provided in this embodiment of the present disclosure can perform the technical solutions described in the foregoing method embodiments of FIG. 2 to FIG. 4. Implementation principles and beneficial effects thereof are similar, and details are not described herein again.

Figure 20:
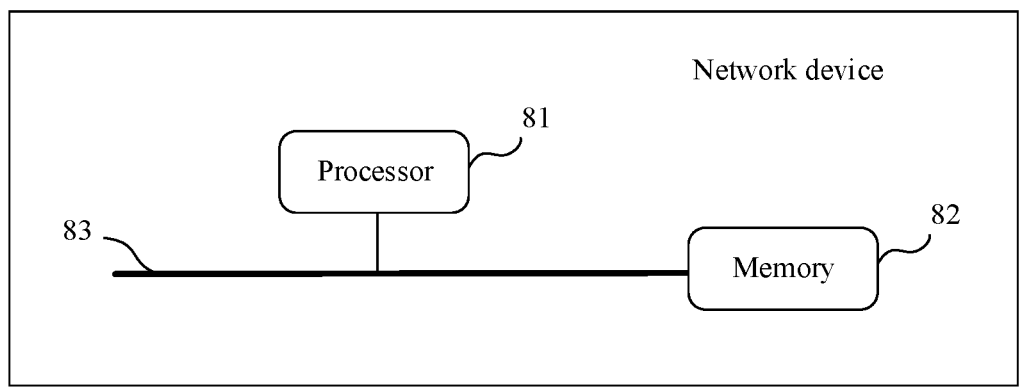
FIG. 20 is a schematic structural diagram of a network device according to a twelfth embodiment of the present disclosure.

FIG. 20 is a schematic structural diagram of a network device according to a twelfth embodiment of the present disclosure. Referring to FIG. 20, the network device includes a processor 81, a memory 82, and a communications bus 83. The communications bus 83 is configured to implement a connection between components. The memory 82 is configured to store a program instruction. The processor 81 is configured to: read the program instruction in the memory 82 and perform, based on a program in the memory 82, the following operations:

obtaining first information of the terminal device, where the first information includes at least one of location information of the terminal device and a protocol data unit (PDU) session state of the terminal device in a local area data network (LADN); and determining a status of the terminal device based on the first information, where the status includes at least one of a loss-of-connectivity state and an available-to-connectivity state.

The network device provided in this embodiment of the present disclosure can perform the technical solutions described in the foregoing method embodiments of FIG. 8 and FIG. 9. Implementation principles and beneficial effects thereof are similar, and details are not described herein again.

In one embodiment, the processor 81 is specifically configured to:

determine a server accessed by the terminal device; and determine the status of the terminal device based on the location information of the terminal device and a service area of the LADN if a data network corresponding to the server is the LADN.

In another embodiment, the processor 81 is specifically configured to:

obtain the service area of the LADN; and determine that the status of the terminal device is the available-to-connectivity state if the terminal device is located within the service area of the LADN; or determine that the status of the terminal device is the loss-of-connectivity state if the terminal device is located outside the service area of the LADN.

In another embodiment, the processor 81 is specifically configured to:

determine that the status of the terminal device is the available-to-connectivity state if the PDU session state of the terminal device in the local data network is an available state; or determine that the status of the terminal device is the loss-of-connectivity state if the PDU session state of the terminal device in the local data network is an unavailable state.

The network device provided in this embodiment of the present disclosure can perform the technical solutions described in the foregoing method embodiments of FIG. 8 and FIG. 9. Implementation principles and beneficial effects thereof are similar, and details are not described herein again.

Figure 21:
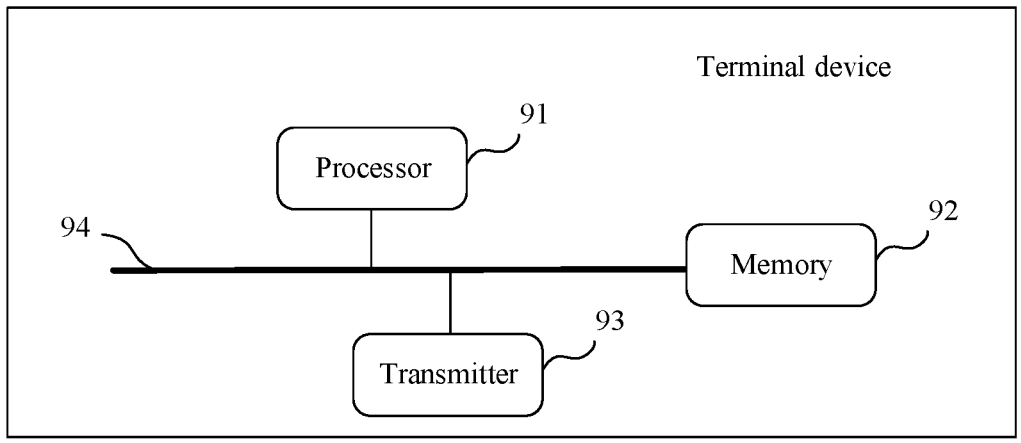
FIG. 21 is a schematic structural diagram of a terminal device according to a thirteenth embodiment of the present disclosure.

FIG. 21 is a schematic structural diagram of a terminal device according to a thirteenth embodiment of the present disclosure. The terminal device includes a processor 91, a memory 92, a transmitter 93, and a communications bus 94. The communications bus 94 is configured to implement a connection between components. The memory 92 is configured to store a program instruction. The processor 91 is configured to read and execute the program instruction in the memory 92.

The processor 91 is configured to obtain access types supported by a server.

The processor 91 is further configured to determine an access type used to access the server among the access types supported by the server.

The transmitter 93 is configured to send, to a network device, the access type used by the terminal device to access the server.

The terminal device provided in this embodiment of the present disclosure can perform the technical solutions described in the foregoing method embodiments of FIG. 5 and FIG. 7. Implementation principles and beneficial effects thereof are similar, and details are not described herein again.

In one embodiment, the processor 91 is specifically configured to:

obtain a priority of the access types supported by the server; and determine, based on the priority, the access type used by the terminal device to access the server.

In another embodiment, the processor 91 is specifically configured to:

receive the priority sent by a policy control function network element.

In another embodiment, the network device includes any one of a server, an access and mobility management network element, a policy control function network element, a network exposure function network element, and a database.

In another embodiment, the processor 91 is specifically configured to:

receive the access types that are used by the terminal device and that are supported by the server, where the access types are sent by the network device.

In another embodiment, the processor 91 is specifically configured to:

determine the access types that are used by the terminal device and that are supported by the server.

The terminal device provided in this embodiment of the present disclosure can perform the technical solutions described in the foregoing method embodiments of FIG. 5 and FIG. 7. Implementation principles and beneficial effects thereof are similar, and details are not described herein again.

Figure 22:
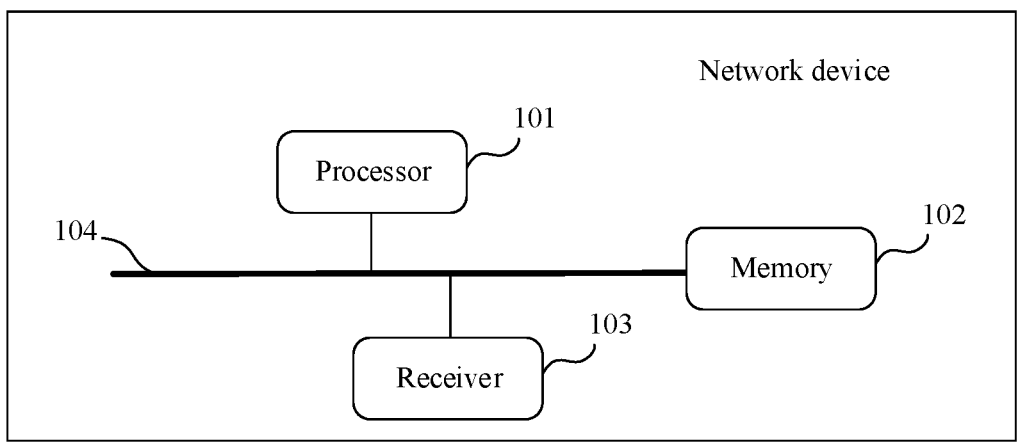
FIG. 22 is a first schematic structural diagram of a network device according to a fourteenth embodiment of the present disclosure.

FIG. 22 is a first schematic structural diagram of a network device according to a fourteenth embodiment of the present disclosure. Referring to FIG. 22, the network device includes a processor 101, a memory 102, a receiver 103, and a communications bus 104. The communications bus 104 is configured to implement a connection between components. The memory 102 is configured to store a program instruction. The processor 101 is configured to read and execute the program instruction in the memory.

The receiver 103 is configured to receive an access type that is sent by another network element and that is used by a terminal device to access a server.

The network device provided in this embodiment of the present disclosure can perform the technical solutions described in the foregoing method embodiments of FIG. 6 and FIG. 7. Implementation principles and beneficial effects thereof are similar, and details are not described herein again.

Figure 23:
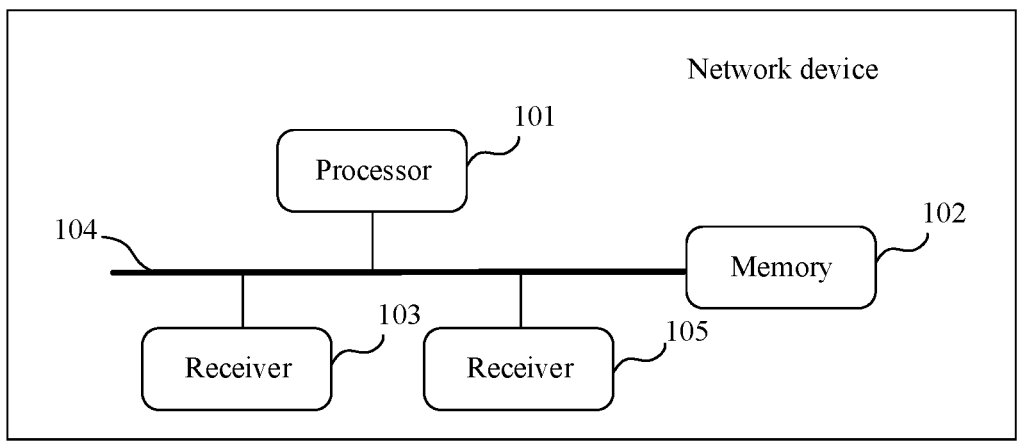
FIG. 23 is a second schematic structural diagram of a network device according to the fourteenth embodiment of the present disclosure.

FIG. 23 is a second schematic structural diagram of a network device according to the fourteenth embodiment of the present disclosure. Based on the embodiment shown in FIG. 22, referring to FIG. 23, the network device further includes a transmitter 105.

The transmitter 105 is configured to send a request message to the another network element before the receiver 103 receives the access type that is sent by the another network element and that is used by the terminal device to access the server, where the request message is used to request to obtain the access type used by the terminal device to access the server.

In another embodiment, the receiver 103 is further configured to receive priority information of the access type sent by the another network element.

In another embodiment, the first network element is an access and mobility management network element, and the another network element includes at least one of a control function network element, a network exposure function network element, a server, a database, and a terminal device.

In another embodiment, the first network element is an access and mobility management network element, the another network element is a terminal device, and the access type used by the terminal device to access the server is an access type that is determined by the terminal device and that is used to access the server.

In another embodiment, the first network element includes an access and mobility management network element, a policy control function network element, a network exposure function network element, or a terminal device.

The network device provided in this embodiment of the present disclosure can perform the technical solutions described in the foregoing method embodiments of FIG. 6 and FIG. 7. Implementation principles and beneficial effects thereof are similar, and details are not described herein again.

An embodiment of the present disclosure provides a computer-readable storage medium. The computer-readable storage medium stores a computer-executable instruction, and when at least one processor of a network device executes the computer-executable instruction, the network device performs the method according to the foregoing method embodiment.

An embodiment of the present disclosure provides a computer program product. The computer program product includes a computer-executable instruction, and the computer-executable instruction is stored in a computer-readable storage medium. At least one processor of a network device may read the computer-executable instruction from the computer-readable storage medium, and the at least one processor executes the computer-executable instruction, so that the network device performs the method according to the foregoing method embodiment.

An embodiment of the present disclosure provides a chip system. The chip system includes a processor, configured to support a network device in implementing the function according to the foregoing method embodiment, for example, processing information in the foregoing method. In a possible design, the chip system further includes a memory. The memory is configured to store a program instruction and data that are appropriate for the network device. The chip system may include a chip, or may include a chip and another discrete device.

All or some of the foregoing embodiments may be implemented by using software, hardware, firmware, or any combination thereof. When the embodiments are implemented by using software, all or some of the embodiments may be implemented in a form of a computer program product. The computer program product may include one or more computer instructions. When the computer program instructions are loaded and executed on a computer, all or some of the processes or functions according to the embodiments of the present disclosure are produced. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device such as a server or a data center that integrates one or more usable media. The usable medium may be a magnetic medium (for example, a soft disk, a hard disk, or a magnetic tape), an optical medium (for example, a DVD), a semiconductor medium (for example, a solid-state disk (SSD)), or the like.

A person of ordinary skill in the art may be aware that, in combination with the examples described in the embodiments disclosed in this specification, units and algorithm operations may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art may clearly understand that, for convenient and brief description, for a detailed working process of the system, apparatus, and unit described above, reference may be made to corresponding processes in the foregoing method embodiments, and this is not limited herein.

In the embodiments provided in the present disclosure, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of the present disclosure. The foregoing storage medium includes: any medium that can store program code, such as a USB flash drive, a removable hard disk, a read-only memory, a random access memory, a magnetic disk, or a compact disc.

What is claimed is:

1. A method for determining a status of a terminal device, comprising:
   obtaining, by an access and mobility management network element, an access type used by the terminal device to access a network, wherein the access type comprises at least one of 3rd generation partnership project (3GPP) access and non-3GPP access;
   determining, by the access and mobility management network element, a connection management status of the terminal device, which indicates whether the terminal device is in a connected state or an idle state;
   determining, by the access and mobility management network element, a mode of the terminal device, wherein the mode of the terminal device is one of a plurality of modes, including a mobile initiated connection only (MICO) mode; and
   determining, by the access and mobility management network element, the status of the terminal device based on the access type used by the terminal device, the connection management status, and the mode of the terminal device, wherein the status of the terminal device is a loss-of-connectivity state or an available-to-connectivity state.

2. The method according to claim 1, wherein the obtaining of the access type used by the terminal device to access the network comprises:
   determining, by the access and mobility management network element, a server accessed by the terminal device; and
   obtaining, by the access and mobility management network element, an access type used by the terminal device to access the server as the access type used by the terminal device to access the network.

3. The method according to claim 2, wherein the obtaining of the access type used by the terminal device to access the server comprises:
   receiving, by the access and mobility management network element, an access type that is sent by the terminal device and that is used by the terminal device to access the server.

4. The method according to claim 2, wherein the determining of the status of the terminal device comprises:
   determining, by the access and mobility management network element, a status of the terminal device corresponding to the server based on the status of the terminal device in the access type.

5. The method according to claim 2, wherein the access type used by the terminal device to access the network comprises the 3GPP access and the non-3GPP access, the access type used by the terminal device to access the server is the 3GPP access, and the determining of the status of the terminal device corresponding to the server comprises:
   determining, by the access and mobility management network element, that the status of the terminal device in the 3GPP access is the loss-of-connectivity state when the terminal device is in the MICO mode and an idle state or when the terminal device is located in a restricted service area.

6. The method according to claim 2, wherein the access type used by the terminal device to access the network is the 3GPP access and the non-3GPP access, the access type used by the terminal device to access the server is the non-3GPP access, and the determining of the status of the terminal device corresponding to the server comprises:
   determining, by the access and mobility management network element, that the status of the terminal device corresponding to the server is the available-to-connectivity state when the terminal device is in a connected state;
   determining, by the access and mobility management network element, that the status of the terminal device corresponding to the server is the loss-of-connectivity state when the terminal device is in an idle state;
   determining, by the access and mobility management network element, that the status of the terminal device corresponding to the server is the available-to-connectivity state when the terminal device is in an idle state and the terminal device can access the server by using a 3GPP technology; or
   determining, by the access and mobility management network element, that the status of the terminal device corresponding to the server is the loss-of-connectivity state when the terminal device is in an idle state and the terminal device cannot access the server by using a 3GPP technology.

7. The method according to claim 2, wherein after the determining of the status of the terminal device, the method further comprises:
   sending, by the access and mobility management network element, the status of the terminal device to the server; or
   sending, by the access and mobility management network element to the server, the status of the terminal device and the access type used by the terminal device to access the server.

8. The method according to claim 1, wherein the obtaining of the access type used by the terminal device to access the network comprises:
   receiving, by the access and mobility management network element, an access type that is sent by a network device and that is used by the terminal device to access the network, wherein the network device comprises at least one of a server, a network exposure function network element, a policy control function network element, and or a database.

9. The method according to claim 8, wherein before the receiving of the access type that is sent by a network device and that is used by the terminal device to access the network, the method further comprises:
   sending, by the access and mobility management network element, identification information of the terminal device to the network device.

10. The method according to claim 8, wherein before the obtaining of the access type used by the terminal device to access a network, the method further comprises:
    receiving, by the access and mobility management network element, identification information of the server that is sent by the server, the network exposure function network element, or the policy control function network element.

11. The method according to claim 1, wherein the determining of the status of the terminal device comprises:
    determining, by the access and mobility management network element, that the status of the terminal device is the available-to-connectivity state when the access type used by the terminal device to access the network is the 3GPP access and the non-3GPP access, and the terminal device in the 3GPP access and/or the non-3GPP access is in the available-to-connectivity state; or
    determining, by the access and mobility management network element, that the status of the terminal device is the loss-of-connectivity state when the access type used by the terminal device to access the network is the 3GPP access and the non-3GPP access, and the terminal device in both the 3GPP access and the non-3GPP access is in the loss-of-connectivity state.

12. The method according to claim 1, wherein the determining of the status of the terminal device in the access type comprises:
    determining, by the access and mobility management network element, that the status of the terminal device in the 3GPP access is the loss-of-connectivity state when the access type used by the terminal device to access the network is the 3GPP access, the terminal device is in the MICO mode and an idle state or when the terminal device is located in a restricted service area.

13. The method according to claim 1, wherein the access type used by the terminal device to access the network is the non-3GPP access, and the determining of the status of the terminal device in the access type comprises:

determining, by the access and mobility management network element, that the status of the terminal device in the non-3GPP access is the loss-of-connectivity state when the terminal device is in an idle state; or determining, by the access and mobility management network element, that the status of the terminal device in the non-3GPP access is the available-to-connectivity state when the terminal device is in a connected state.

14. A method of determining a status of a terminal device, comprising:

obtaining, by an access and mobility management network element, first information of the terminal device, wherein the first information comprises location information of the terminal device, and a protocol data unit (PDU) session state of the terminal device in a local area data network (LADN), wherein the location information of the terminal device indicates whether the terminal device is located within a restricted service area; and determining, by the access and mobility management network element, the status of the terminal device based on the first information, wherein the status comprises at least one of a loss-of-connectivity state and an available-to-connectivity state.

15. The method according to claim 14, wherein the determining, of the status of the terminal device based on the first information comprises:

determining, by the access and mobility management network element, a server accessed by the terminal device; and determining, by the access and mobility management network element, the status of the terminal device based on the location information of the terminal device and a service area of the LADN if a data network corresponding to the server is the LADN.

16. The method according to claim 15, wherein the determining of the status of the terminal device based on the location information of the terminal device and a service area of the LADN comprises:

obtaining, by the access and mobility management network element, the service area of the LADN; and determining, by the access and mobility management network element, that the status of the terminal device is the available-to-connectivity state if the terminal device is located within the service area of the LADN; or determining, by the access and mobility management network element, that the status of the terminal device is the loss-of-connectivity state if the terminal device is located outside the service area of the LADN.

17. The method according to claim 14, wherein the determining of the status of the terminal device based on the first information comprises:

determining, by the access and mobility management network element, that the status of the terminal device is the available-to-connectivity state when the PDU session state of the terminal device in the LADN is an available state; or determining, by the access and mobility management network element, that the status of the terminal device is the loss-of-connectivity state if the PDU session state of the terminal device in the LADN is an unavailable state.

18. An apparatus for determining a status of a terminal device, comprising:

a processor;

a memory coupled to the processor, and storing program instructions, which, when executed by the processor, cause the processor to perform operations:

obtaining an access type used by the terminal device to access a network, wherein the access type comprises at least one of 3rd generation partnership project (3GPP) access and non-3GPP access;

determining a connection management status of the terminal device, which indicates whether the terminal device is in a connected state or an idle state;

determining a mode of the terminal device, wherein the mode of the terminal device is one of a plurality of modes, including a mobile initiated connection only (MICO) mode; and determining the status of the terminal device based on the access type used by the terminal device, the connection management status, and the mode of the terminal device, wherein the status of the terminal device is a loss-of-connectivity state or an available-to-connectivity state.

19. The apparatus according to claim 18, the operations further comprising:

determining a server accessed by the terminal device; and obtaining an access type used by the terminal device to access the server.

* * * * *

UNITED STATES PATENT AND TRADEMARK OFFICE
CERTIFICATE OF CORRECTION

PATENT NO. : 11,310,658 B2
APPLICATION NO. : 16/850316
DATED : April 19, 2022
INVENTOR(S) : Wei Lu, Huan Li and Weisheng Jin It is certified that error appears in the above-identified patent and that said Letters Patent is hereby corrected as shown below:

In the Claims

In Claim 8, Column 52, Line 21, delete "element, and or a database." and insert --element, or a database.--.

Signed and Sealed this
Thirtieth Day of August, 2022

*Katherine Kelly Vidal*

Katherine Kelly Vidal
*Director of the United States Patent and Trademark Office*